(12) United States Patent
DeVries et al.

(10) Patent No.: US 8,991,425 B2
(45) Date of Patent: Mar. 31, 2015

(54) WATERWAY ASSEMBLY INCLUDING AN OVERMOLDED SUPPORT PLATE

(71) Applicant: Masco Corporation of Indiana, Indianapolis, IN (US)

(72) Inventors: Adam M. DeVries, Anderson, IN (US); Christopher Michael McGuire, Fishers, IN (US); Kurt Judson Thomas, Indianapolis, IN (US)

(73) Assignees: Delta Faucet Company, Indianapolis, IN (US); Mercury Plastics, Inc., Middlefield, OH (US)

( * ) Notice: Subject to any disclaimer, the term of this patent is extended or adjusted under 35 U.S.C. 154(b) by 190 days.

(21) Appl. No.: 13/828,598

(22) Filed: Mar. 14, 2013

(65) Prior Publication Data

US 2013/0263936 A1 Oct. 10, 2013

Related U.S. Application Data

(63) Continuation-in-part of application No. 13/758,800, filed on Feb. 4, 2013, which is a continuation of application No. 12/848,737, filed on Aug. 2, 2010, now Pat. No. 8,365,770, which is a continuation of application No. 11/700,634, filed on Jan. 31, 2007, now Pat. No. 7,766,043.

(60) Provisional application No. 60/809,033, filed on May 26, 2006.

(51) Int. Cl.
*F16K 11/06* (2006.01)
*E03C 1/04* (2006.01)
*F16K 11/00* (2006.01)
*F16K 27/04* (2006.01)

(52) U.S. Cl.
CPC ............... *E03C 1/04* (2013.01); *F16K 19/006* (2013.01); *F16K 27/044* (2013.01); *E03C 1/0401* (2013.01); *E03C 1/0403* (2013.01)
USPC ............................................. 137/625.4; 4/695

(58) Field of Classification Search
USPC ................ 137/625.17, 625.4, 625.41, 801; 251/367; 4/695
See application file for complete search history.

(56) References Cited

U.S. PATENT DOCUMENTS

| | | |
|---|---|---|
| 2,200,091 A | 5/1940 | Kovach |
| 2,219,471 A | 10/1940 | Davis |
| 2,546,327 A | 3/1951 | Young |
| 2,548,933 A | 4/1951 | Barnett |
| 2,781,786 A | 2/1957 | Young |

(Continued)

FOREIGN PATENT DOCUMENTS

| | | |
|---|---|---|
| CA | 2405672 | 9/2002 |
| DE | 10133041 | 1/2003 |

(Continued)

OTHER PUBLICATIONS

Brizo Models 63700 & 63810 Venuto, High-Rise Pull-Down Kitchen and Bar/Prep Faucets Installation Instructions Sep. 23, 2004, 4 sheets.

(Continued)

*Primary Examiner* — John Fox
(74) *Attorney, Agent, or Firm* — Faegre Baker Daniels LLP

(57) ABSTRACT

A faucet including a molded waterway assembly having a plurality of tubes and a support plate overmolded within a valve interface member.

20 Claims, 25 Drawing Sheets

(56) References Cited

U.S. PATENT DOCUMENTS

| | | |
|---|---|---|
| 2,884,007 A | 4/1959 | Green |
| 3,229,710 A | 1/1966 | Keller, III |
| 3,422,849 A | 1/1969 | Manoogian |
| 3,448,768 A | 6/1969 | Keller, III |
| 3,505,098 A | 4/1970 | Miller et al. |
| 3,520,325 A | 7/1970 | Stuart |
| 3,580,289 A | 5/1971 | James et al. |
| 3,590,876 A | 7/1971 | Young |
| 3,600,723 A | 8/1971 | Mongerson et al. |
| 3,714,958 A | 2/1973 | Johnson et al. |
| 3,757,824 A | 9/1973 | Parkhurst et al. |
| 3,770,004 A | 11/1973 | Johnson et al. |
| 3,796,380 A | 3/1974 | Johnson et al. |
| 3,807,453 A | 4/1974 | Dom et al. |
| 3,854,493 A | 12/1974 | Farrell |
| 3,965,936 A | 6/1976 | Lyon |
| 3,989,787 A | 11/1976 | Scott, Jr. et al. |
| 3,998,240 A | 12/1976 | Liautaud |
| 4,026,328 A | 5/1977 | Nelson |
| 4,076,279 A | 2/1978 | Klotz et al. |
| 4,103,709 A | 8/1978 | Fischer |
| 4,130,136 A | 12/1978 | Garnier et al. |
| 4,221,338 A | 9/1980 | Shames et al. |
| 4,262,699 A | 4/1981 | Fabian |
| 4,316,870 A | 2/1982 | Rowley |
| 4,337,795 A | 7/1982 | Argyris et al. |
| 4,356,574 A | 11/1982 | Johnson |
| 4,357,957 A | 11/1982 | Bisonaya et al. |
| 4,387,738 A | 6/1983 | Bisonaya et al. |
| 4,397,330 A | 8/1983 | Hayman |
| 4,415,389 A | 11/1983 | Medford et al. |
| 4,446,084 A | 5/1984 | Rowley |
| 4,453,567 A | 6/1984 | MacDonald |
| 4,458,839 A | 7/1984 | MacDonald |
| 4,484,600 A | 11/1984 | Peterson et al. |
| 4,502,507 A | 3/1985 | Hayman |
| 4,513,769 A | 4/1985 | Purcell |
| 4,525,136 A | 6/1985 | Rowley |
| 4,552,171 A | 11/1985 | Farrell et al. |
| 4,577,835 A | 3/1986 | Holycross et al. |
| 4,580,601 A | 4/1986 | Schlotman et al. |
| 4,592,388 A | 6/1986 | Wilcox |
| 4,607,659 A | 8/1986 | Cole |
| 4,610,429 A | 9/1986 | Arnold et al. |
| 4,626,005 A | 12/1986 | Stifter |
| 4,635,673 A | 1/1987 | Gerdes |
| 4,649,958 A | 3/1987 | Purcell |
| 4,652,263 A | 3/1987 | Herweck et al. |
| 4,664,423 A | 5/1987 | Rowley |
| 4,667,987 A | 5/1987 | Knebel |
| 4,671,316 A | 6/1987 | Botnick |
| 4,687,025 A | 8/1987 | Kahle et al. |
| 4,700,928 A | 10/1987 | Marty |
| 4,708,172 A | 11/1987 | Riis |
| 4,749,003 A | 6/1988 | Leason |
| 4,754,993 A | 7/1988 | Kraynick |
| 4,760,871 A | 8/1988 | Vijay |
| 4,762,143 A | 8/1988 | Botnick |
| 4,773,348 A | 9/1988 | Rowley |
| 4,783,303 A | 11/1988 | Imgram |
| 4,803,033 A | 2/1989 | Rowley |
| 4,838,304 A | 6/1989 | Knapp |
| 4,853,164 A | 8/1989 | Kiang et al. |
| 4,877,660 A | 10/1989 | Overbergh et al. |
| 4,887,642 A | 12/1989 | Bernat |
| 4,942,644 A | 7/1990 | Rowley |
| 4,957,135 A | 9/1990 | Knapp |
| 4,971,112 A | 11/1990 | Knapp |
| 4,979,530 A | 12/1990 | Breda |
| 5,001,008 A | 3/1991 | Tokita et al. |
| 5,006,207 A | 4/1991 | Peterman et al. |
| 5,027,851 A | 7/1991 | Drees et al. |
| 5,053,097 A | 10/1991 | Johansson et al. |
| 5,090,062 A | 2/1992 | Hochstrasser |
| 5,095,554 A | 3/1992 | Gloor |
| 5,100,565 A | 3/1992 | Fujiwara et al. |
| 5,110,044 A | 5/1992 | Bergmann |
| 5,127,814 A | 7/1992 | Johnson et al. |
| 5,131,428 A | 7/1992 | Bory |
| 5,148,837 A | 9/1992 | Ågren et al. |
| 5,150,922 A | 9/1992 | Nakashiba et al. |
| 5,219,185 A | 6/1993 | Oddenino |
| 5,279,333 A | 1/1994 | Lawrence |
| 5,340,018 A | 8/1994 | Macdonald et al. |
| 5,366,253 A | 11/1994 | Nakashiba et al. |
| 5,375,889 A | 12/1994 | Nakashiba et al. |
| 5,397,102 A | 3/1995 | Kingman |
| 5,417,242 A | 5/1995 | Goncze |
| 5,437,345 A | 8/1995 | Schmidt et al. |
| 5,493,873 A | 2/1996 | Donselman et al. |
| 5,494,259 A | 2/1996 | Peterson |
| 5,518,027 A | 5/1996 | Saiki et al. |
| 5,527,503 A | 6/1996 | Rowley |
| 5,553,935 A | 9/1996 | Burnham et al. |
| 5,555,912 A | 9/1996 | Saadi et al. |
| 5,558,128 A | 9/1996 | Pawelzik et al. |
| 5,566,707 A | 10/1996 | Ching et al. |
| 5,573,037 A | 11/1996 | Cole et al. |
| 5,577,393 A | 11/1996 | Donselman et al. |
| 5,579,808 A | 12/1996 | Mikol et al. |
| 5,582,438 A | 12/1996 | Wilkins et al. |
| 5,586,746 A | 12/1996 | Humpert et al. |
| 5,611,093 A | 3/1997 | Barnum et al. |
| 5,615,709 A | 4/1997 | Knapp |
| 5,622,210 A | 4/1997 | Crisman et al. |
| 5,622,670 A | 4/1997 | Rowley |
| 5,642,755 A * | 7/1997 | Mark et al. ............... 137/801 |
| 5,660,692 A | 8/1997 | Nesburn et al. |
| 5,669,407 A | 9/1997 | Bailey |
| 5,669,417 A | 9/1997 | Lian-Jie |
| 5,669,595 A | 9/1997 | Bytheway |
| 5,685,341 A | 11/1997 | Chrysler et al. |
| 5,687,952 A | 11/1997 | Arnold et al. |
| 5,695,094 A | 12/1997 | Burnham et al. |
| 5,725,008 A | 3/1998 | Johnson |
| 5,730,173 A | 3/1998 | Sponheimer |
| 5,741,458 A | 4/1998 | Rowley |
| 5,746,244 A | 5/1998 | Woolley, Sr. et al. |
| 5,756,023 A | 5/1998 | Stachowiak |
| 5,758,690 A | 6/1998 | Humpert et al. |
| 5,775,587 A | 7/1998 | Davis |
| 5,803,120 A | 9/1998 | Bertoli |
| 5,813,435 A | 9/1998 | Knapp |
| 5,833,279 A | 11/1998 | Rowley |
| 5,850,855 A | 12/1998 | Kerschbaumer et al. |
| 5,857,489 A | 1/1999 | Chang |
| 5,861,200 A | 1/1999 | Rowley |
| 5,865,473 A | 2/1999 | Semchuchk et al. |
| 5,875,809 A | 3/1999 | Barrom |
| 5,893,387 A | 4/1999 | Paterson et al. |
| 5,895,695 A | 4/1999 | Rowley |
| 5,916,647 A | 6/1999 | Weinstein |
| 5,924,451 A | 7/1999 | Kuo |
| 5,927,333 A | 7/1999 | Grassberger |
| 5,934,325 A | 8/1999 | Brattoli et al. |
| 5,937,892 A | 8/1999 | Meisner et al. |
| 5,944,225 A | 8/1999 | Kawolics |
| 5,950,663 A | 9/1999 | Bloomfield |
| 5,960,490 A | 10/1999 | Pitch |
| 5,965,077 A | 10/1999 | Rowley et al. |
| 5,975,143 A | 11/1999 | Järvenkylä et al. |
| 5,979,489 A | 11/1999 | Pitch |
| 6,013,382 A | 1/2000 | Coltrinari et al. |
| 6,023,796 A | 2/2000 | Pitch |
| 6,029,860 A | 2/2000 | Donselman et al. |
| 6,029,948 A | 2/2000 | Shafer |
| 6,044,859 A | 4/2000 | Davis |
| 6,053,214 A | 4/2000 | Sjoberg et al. |
| 6,062,251 A | 5/2000 | Pitch |
| 6,070,614 A | 6/2000 | Holzheimer et al. |
| 6,070,916 A | 6/2000 | Rowley |
| 6,073,972 A | 6/2000 | Rivera |
| 6,079,447 A | 6/2000 | Holzheimer et al. |
| 6,082,407 A | 7/2000 | Paterson et al. |

(56) References Cited

U.S. PATENT DOCUMENTS

| | | | |
|---|---|---|---|
| 6,082,780 A | 7/2000 | Rowley et al. | |
| 6,085,784 A | 7/2000 | Bloom et al. | |
| 6,116,884 A | 9/2000 | Rowley | |
| 6,123,232 A | 9/2000 | Donselman et al. | |
| 6,131,600 A | 10/2000 | Chang | |
| 6,138,296 A | 10/2000 | Baker | |
| 6,155,297 A | 12/2000 | MacAusland et al. | |
| 6,161,230 A | 12/2000 | Pitsch | |
| 6,170,098 B1 | 1/2001 | Pitsch | |
| 6,177,516 B1 | 1/2001 | Hudak | |
| 6,202,686 B1 | 3/2001 | Pitsch et al. | |
| 6,227,464 B1 | 5/2001 | Allmendinger et al. | |
| 6,238,575 B1 | 5/2001 | Patil | |
| 6,256,810 B1 | 7/2001 | Baker | |
| 6,270,125 B1 | 8/2001 | Rowley et al. | |
| 6,286,808 B1 | 9/2001 | Slothower et al. | |
| 6,287,501 B1 | 9/2001 | Rowley | |
| 6,289,915 B1 * | 9/2001 | Nulman et al. | 137/43 |
| 6,293,336 B1 | 9/2001 | Emerick, Sr. et al. | |
| 6,296,017 B2 | 10/2001 | Kimizuka | |
| 6,305,407 B1 | 10/2001 | Selby | |
| 6,315,715 B1 | 11/2001 | Taylor et al. | |
| 6,328,059 B1 | 12/2001 | Testori et al. | |
| 6,328,067 B1 | 12/2001 | Hsiung | |
| 6,334,466 B1 | 1/2002 | Jani et al. | |
| 6,341,617 B1 | 1/2002 | Wilson | |
| 6,349,733 B1 | 2/2002 | Smith | |
| 6,378,790 B1 | 4/2002 | Paterson et al. | |
| 6,385,794 B1 | 5/2002 | Miedzius et al. | |
| 6,386,226 B1 | 5/2002 | Lopp et al. | |
| 6,439,581 B1 | 8/2002 | Chang | |
| 6,464,266 B1 | 10/2002 | O'Neill et al. | |
| 6,485,666 B1 | 11/2002 | Rowley | |
| 6,557,907 B2 | 5/2003 | Rowley | |
| 6,609,732 B1 | 8/2003 | Souvatzidis et al. | |
| 6,635,334 B1 | 10/2003 | Jackson et al. | |
| 6,640,357 B1 | 11/2003 | Chang | |
| 6,732,543 B2 | 5/2004 | Jenkins, Jr. et al. | |
| 6,757,921 B2 | 7/2004 | Esche | |
| 6,770,376 B2 | 8/2004 | Chen | |
| 6,770,384 B2 | 8/2004 | Chen | |
| 6,783,160 B2 | 8/2004 | Rowley | |
| 6,792,629 B2 | 9/2004 | Nelson et al. | |
| 6,803,133 B2 | 10/2004 | Chen | |
| 6,817,379 B2 | 11/2004 | Perla | |
| 6,835,777 B2 | 12/2004 | Botros | |
| 6,838,041 B2 | 1/2005 | Rowley | |
| 6,848,719 B2 | 2/2005 | Rowley | |
| 6,860,523 B2 | 3/2005 | O'Neill et al. | |
| 6,860,524 B1 | 3/2005 | Rowley | |
| 6,877,172 B2 | 4/2005 | Malek et al. | |
| 6,894,115 B2 | 5/2005 | Botros | |
| 6,902,210 B1 | 6/2005 | Rowley | |
| 6,920,899 B2 | 7/2005 | Haenlein et al. | |
| 6,959,736 B2 | 11/2005 | Järvenkylä | |
| 6,962,168 B2 | 11/2005 | McDaniel et al. | |
| 6,978,795 B2 | 12/2005 | Perrin | |
| 7,017,600 B2 | 3/2006 | Kelin | |
| 7,063,105 B1 | 6/2006 | Chen | |
| 7,111,640 B2 | 9/2006 | Rhodes | |
| 7,118,138 B1 | 10/2006 | Rowley et al. | |
| 7,134,452 B2 | 11/2006 | Hiroshi et al. | |
| 7,225,828 B2 | 6/2007 | Giagni et al. | |
| 7,231,936 B2 | 6/2007 | Chang | |
| 7,334,604 B1 | 2/2008 | Hwang et al. | |
| 7,717,133 B2 | 5/2010 | Pinette et al. | |
| 7,766,043 B2 | 8/2010 | Thomas et al. | |
| 7,871,020 B2 | 1/2011 | Nelson et al. | |
| 8,240,326 B2 | 8/2012 | Kacik et al. | |
| 8,746,273 B2 * | 6/2014 | Yang et al. | 137/315.12 |
| 2002/0100139 A1 | 8/2002 | Rowley | |
| 2002/0100510 A1 | 8/2002 | Otelli | |
| 2002/0167171 A1 | 11/2002 | Becker et al. | |
| 2003/0183286 A1 | 10/2003 | Yang | |
| 2004/0007278 A1 | 1/2004 | Williams | |
| 2004/0021120 A1 | 2/2004 | Turnau, III et al. | |
| 2004/0060608 A1 | 4/2004 | Angus | |
| 2004/0117906 A1 | 6/2004 | Baker et al. | |
| 2004/0150132 A1 | 8/2004 | Rowley | |
| 2004/0176503 A1 | 9/2004 | Czayka et al. | |
| 2005/0005989 A1 | 1/2005 | Roloff | |
| 2005/0189023 A1 | 9/2005 | Hsien | |
| 2005/0194051 A1 | 9/2005 | Pinette | |
| 2006/0108705 A1 | 5/2006 | Rowley | |
| 2006/0118185 A1 | 6/2006 | Nobili | |
| 2006/0124183 A1 | 6/2006 | Kuo | |
| 2006/0130908 A1 | 6/2006 | Marty et al. | |
| 2006/0170134 A1 | 8/2006 | Rowley et al. | |
| 2006/0174955 A1 | 8/2006 | Huang | |
| 2006/0202142 A1 | 9/2006 | Marty et al. | |
| 2006/0283511 A1 | 12/2006 | Nelson | |
| 2006/0289343 A1 | 12/2006 | Schmitt et al. | |
| 2007/0044852 A1 | 3/2007 | Pinette | |
| 2007/0137714 A1 | 6/2007 | Meehan et al. | |
| 2007/0137718 A1 | 6/2007 | Rushlander et al. | |
| 2007/0271695 A1 | 11/2007 | Thomas et al. | |
| 2008/0178950 A1 | 7/2008 | Marty et al. | |
| 2008/0178954 A1 | 7/2008 | Pinette et al. | |
| 2008/0178957 A1 | 7/2008 | Thomas et al. | |

FOREIGN PATENT DOCUMENTS

| | | |
|---|---|---|
| EP | 0 378 406 | 7/1990 |
| EP | 0 632 220 | 1/1995 |
| EP | 0 808 952 | 11/1997 |
| EP | 0 950 843 | 10/1999 |
| JP | 3094877 | 4/1991 |
| JP | 200132343 | 2/2001 |
| WO | WO 91/05191 | 4/1991 |
| WO | WO 00/61831 | 10/2000 |
| WO | WO 02/25022 | 3/2002 |
| WO | WO 03078875 | 9/2003 |
| WO | WO 2005/108829 | 11/2005 |
| WO | WO 2006/099273 | 9/2006 |
| WO | WO 2007/139605 | 12/2007 |

OTHER PUBLICATIONS

Dadex Polydex—PPR Pipe System for Hot and Cold Water Supply and Distribution, 2005, 2 pgs.
Dadex Polydex, 2005, 1 pg.
Dow, Plastic Pipes Europe, Middle East & Africa, Hot and Cold Water Pipes, 2007, 1 pg.
Dow, Plastic Pipes Europe, Middle East, & Africa, Dowlex PE-RT, 2007, 2 pgs.
International Search Report and Written Opinion for PCT Application No. PCT/US2010/025524, issued May 3, 2010, 10 pgs.
Kerox, Ceramic Mixing Cartridge, Conventional Single-Lever Type, Model K-28, at least as early as May 21, 2007, 2 pgs.
Kerox, Standard Cartridges, 2005, 3 pgs.
MOEN® "One-Handle Kitchen Faucet Models 7100,7106 series," installation instructions, IN51632A, May 2008, 6 pgs.
MOEN® Models 7100 series, 7106 series with spray specifications, Aug. 2009 and Jun. 2008, 2 pgs.
MOEN® Models 7100, 7100CSL, 7106, 7106CSL Illustrated Parts, Jul. 2009 and Mar. 2009, 2 pgs.
Noveon, Inc.; Processing with TempRite® PEX Ensures Quality Piping, www.tempritepex.com/processingInstallation/processing. asp, at least as early as Jun. 7, 2005, 2 pgs.
PEX Association, What is PE-X?, at least as early as May 21, 2007, 7 pgs.
PPI Plastics Pipe Institute, Crosslinked Polyethylene (PEX) Tubing, TN-17/2001, www.plasticpipe.org/pdf/pubs/notes/tn17-01.pdf, Jun. 2001, 7 pgs.
SpecialChem S.A., Silane Crosslinking Agents Center, Crosslinking Mechanism, www.specialchem4polymers.com/tc/silane-crosslinking-agents/index.aspx?id=mechanism, at least as early as Jun. 7, 2005, 2 pgs.
Ticona Engineering Polymers, Engineering Polymers for Innovative Applications catalog, Mar. 2006, 16 pgs.

* cited by examiner

WATERWAY ASSEMBLY INCLUDING AN OVERMOLDED SUPPORT PLATE

CROSS-REFERENCE TO RELATED APPLICATION

This application is a continuation-in-part of U.S. patent application Ser. No. 13/758,800, filed Feb. 4, 2013, which is a continuation of U.S. patent application Ser. No. 12/848,737, filed Aug. 2, 2010, now U.S. Pat. No. 8,365,770, which is a continuation of U.S. patent application Ser. No. 11/700,634, filed Jan. 31, 2007, now U.S. Pat. No. 7,766,043, which claims the benefit of U.S. Provisional Application Ser. No. 60/809,033, filed May 26, 2006, the disclosures of which are expressly incorporated by reference herein.

BACKGROUND AND SUMMARY OF THE INVENTION

The present invention relates generally to plumbing fixtures and, more particularly, to a faucet including a molded waterway assembly.

Single handle faucets typically include mixing valves that control the flow of both hot and cold water to a delivery spout. These faucets have found wide acceptance and are commonly constructed such that a handle or knob is movable in distinct directions to adjust the temperature (i.e., the mix of hot and cold water) and the flow rate of water.

Conventional mixing valves typically include a machined brass body and associated brass fittings. The brass body usually includes a hot water inlet, a cold water inlet, and a mixed water outlet. An adjustable valve element, typically either a mixing ball or a slidable plate, is manipulated by a handle to control the aforementioned temperature and flow rate of water. In conventional faucets, copper tubes are usually brazed to the inlets and the outlet(s) of the valve body and to associated fittings. Following the brazing operation, an etching or bright dip operation is typically performed to clean the metal surfaces of contaminants.

It may be appreciated that such conventional mixing valves have certain disadvantages. For example, the cost of copper tubing and the additional assembly cost associated with the brazing and bright dipping operations may be significant. The bright dipping operation may also result in the undesirable deposit of metal on the valve body. As such, it is known that the use of plastic materials for waterways may reduce cost, eliminate metal contact, and provide protection against acidic and other aggressive water conditions. The use of non-metallic materials in plumbing fixtures is significant given the growing concern about the quality of potable water. The U.S. Environmental Protection Agency, NSF International (National Sanitary Foundation) and other health-related organizations are actively seeking to reduce the metal content (i.e., copper and lead) in water.

Previous plastic faucets have often attempted to use plastic in a method similar to brass, i.e., as both a structural component and a water conducting mechanism. This has caused some issues because the yield strength and stiffness of most plastics are not similar to the properties of brass. This may result in the need to use higher grade materials that can be difficult to process. Alternatively, materials less suitable for structural applications may be used in the interest of cost and long term durability.

According to an illustrative embodiment of the present disclosure, a fluid delivery device includes a waterway assembly having a first inlet fluid transport component formed of a polymer and with opposing first and second ends, and an outlet fluid transport component formed of a polymer and with opposing first and second ends. The waterway assembly further includes a base formed of a polymer and having an upper surface and a lower surface and being overmolded around the first end of the first inlet fluid transport component and the first end of the outlet fluid transport component. A valve assembly includes a first inlet port in fluid communication with the first inlet fluid transport component, and an outlet port in fluid communication with the outlet fluid transport component. The valve assembly further includes a lower surface facing the upper surface of the base and sealingly engaged with the base. The valve assembly further includes a movable valve member configured to control the flow of water from the first inlet port to the outlet port.

According to a further illustrative embodiment of the present disclosure, a faucet includes a holder, and a waterway assembly including a base supported by the holder. A hot water inlet tubular member includes a first end fluidly coupled to the base and a second end configured to be fluidly coupled to a hot water supply. A cold water inlet tubular member includes a first end fluidly coupled to the base and a second end configured to be fluidly coupled to a cold water supply. An outlet tubular member includes a first end fluidly coupled to the base and a second end. A valve assembly includes a hot water inlet port in fluid communication with the hot water inlet tubular member, and a cold water inlet port in fluid communication with the cold water tubular member. The valve assembly further includes an outlet port in fluid communication with the outlet tubular member, and a lower surface facing an upper surface of the base and sealingly couple with the base. The valve assembly also includes a movable valve member configured to control the flow of water from the inlet ports to the outlet port. A locking member is operably coupled to the valve assembly and is configured to secure the valve assembly to the waterway assembly.

According to a further illustrative embodiment of the present disclosure, a fluid delivery device includes a valve assembly having a lower surface and a first locating element supported by the lower surface. The fluid delivery device further includes a waterway assembly having a first fluid transport component having opposing first and second ends, and a second fluid transport component having opposing first and second ends. A base includes an upper surface and a lower surface and is overmolded around the first end of the first fluid transport component and the first end of the second fluid transport component. The waterway assembly further includes a second locating element supported by upper surface of the base and is configured to cooperate with the first locating element of the valve assembly to facilitate proper orientation of the valve assembly relative to the waterway assembly.

According to another illustrative embodiment of the present disclosure, a faucet includes a valve assembly, and a waterway assembly including a first inlet fluid transport component formed of a non-metallic material and having opposing first and second ends, and an outlet fluid transport component formed of a non-metallic material and having opposing first and second ends. The waterway assembly further includes a base formed of a non-metallic material and having an upper surface and a lower surface, the base being fluidly coupled to the first end of the first fluid inlet transport component, the first end of the outlet fluid transport component, and the valve assembly. An upper housing is formed of a non-metallic material and includes a spout having an outlet fluidly coupled to the outlet fluid transport component, and a channel to receive the outlet fluid transport component.

According to a further illustrative embodiment of the present disclosure, a waterway assembly includes a plurality of flexible tubular members formed of a polymer and having opposing first and second ends. The waterway assembly further includes a base formed of a polymer and overmolded around the first end to the plurality of tubular members.

According to yet another illustrative embodiment of the present disclosure, a waterway assembly includes a base including a plurality of openings. A plurality of tubular members formed of a cross-linked polymer includes opposing first and second ends, the first ends of the plurality of tubular members being received within the plurality of openings of the base.

According to a further illustrative embodiment of the present disclosure, a fluid delivery device includes a flow directing member, and a molded waterway fluidly coupled to the flow directing member. The molded waterway includes a base having an inlet opening and an outlet opening, and a flexible tubular member fluidly coupled to the inlet opening. A fluid passageway extends from the inlet opening, through the flow directing member and out of the outlet opening wherein the fluid travels in a first direction through the inlet opening and in a second direction, different from the first direction, through the outlet opening.

According to another illustrative embodiment of the present disclosure, a base for a waterway assembly includes an upper surface, a lower surface, a first inlet opening in fluid communication with the upper surface, and an outlet opening in fluid communication with the upper surface and positioned in spaced relation to the inlet opening. The base is formed of a cross-linked polymer.

According to a further illustrative embodiment of the present disclosure, a waterway assembly includes a plurality of flexible tubular members formed of a polymer and having opposing first and second ends. A valve interface member is formed of a polymer and overmolded around the first ends of the plurality of tubular members. The valve interface member includes a first surface, a second surface, a plurality of openings extending into the first surface and in fluid communication with the plurality of tubular members, a seat defined by the first surface and extending around the plurality of openings and configured to seal with a valve assembly to provide fluid communication between the plurality of openings and the valve assembly.

According to another illustrative embodiment of the present disclosure, a waterway assembly includes a base having a first surface, a second surface, a plurality of openings extending from the first surface to the second surface, and a seat defined by the first surface and configured to sealingly interface with a valve assembly. A plurality of tubular members are formed of a cross-linked polymer and include opposing first and second ends, the first ends of the plurality of tubular members being received within the plurality of openings of the base and extending from the second surface. A plurality of fluid couplings are supported by the second ends of the plurality of tubular members.

According to a further illustrative embodiment of the present disclosure, a valve interface member for a waterway assembly includes an upper surface, a lower surface, a first inlet opening extending into the upper surface, and an outlet opening extending into the upper surface and positioned in spaced relation to the inlet opening. A first flow directing channel extends into the upper surface, extends outwardly from the first inlet opening, and is in fluid communication with the first inlet opening. A second flow directing channel extends into the upper surface, extends outwardly from the outlet opening, and is in fluid communication with the outlet opening. A valve assembly seat is supported by the upper surface and extends around the first flow directing channel and the second flow directing channel, wherein the valve interface member is formed of a cross-linked polymer.

According to another illustrative embodiment of the present disclosure, a waterway assembly includes a plurality of tubular members formed of a polymer and having opposing first and second ends. A support plate includes a plurality of openings aligned with the first ends of the plurality of tubular members. The support plate has a plate stiffness. A base is formed of a polymer and has a base stiffness. The base is overmolded around the first ends of the plurality of tubular members and the support plate. The plate stiffness is greater than the base stiffness.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention. Although the disclosure is described in connection with water, it should be understood that additional types of fluids may be used.

Figure 1A:
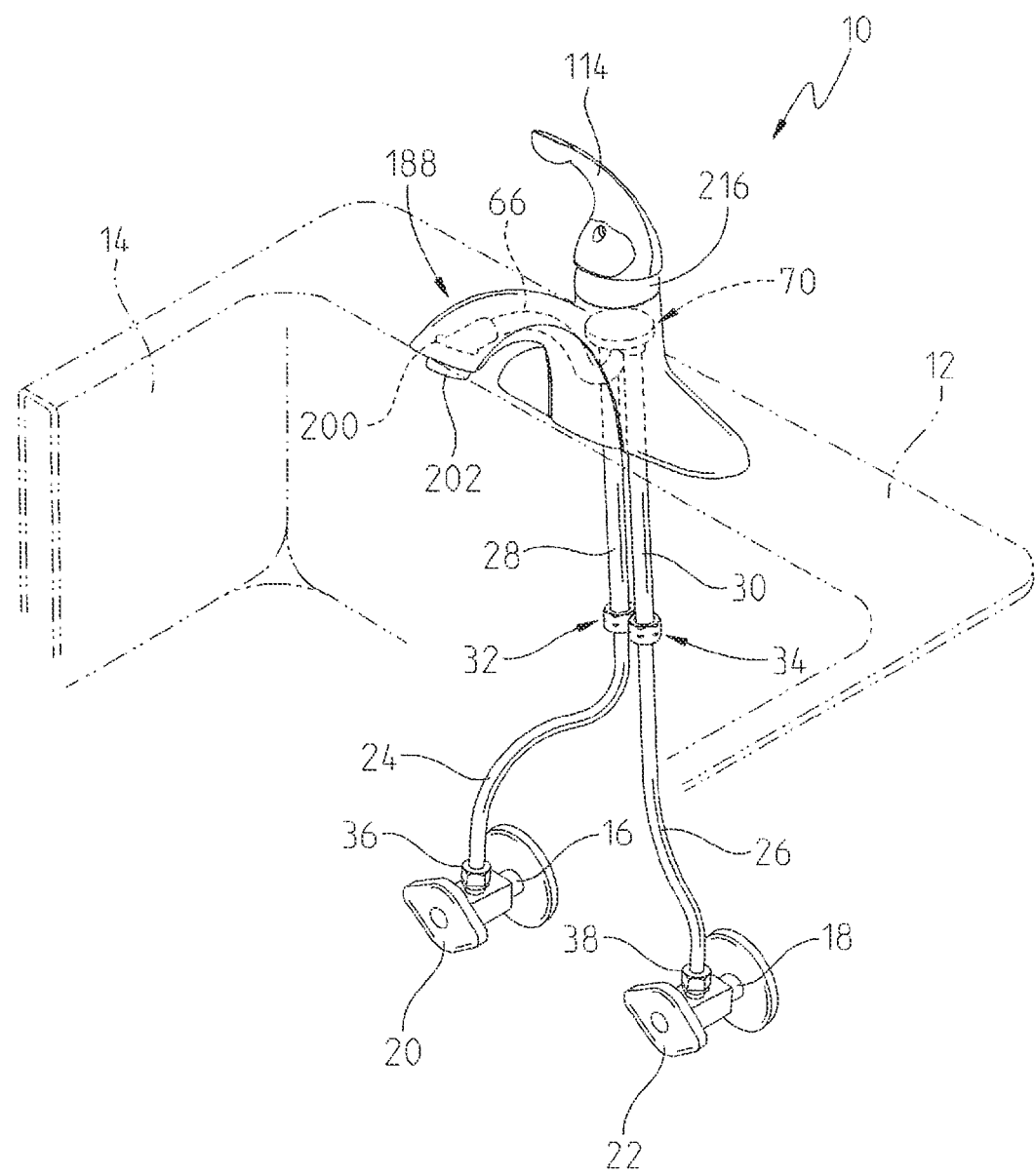
FIG. 1A is a perspective view of an illustrative embodiment faucet of the present disclosure mounted to a sink deck and fluidly coupled to hot and cold water supply lines.
Figure 1B:
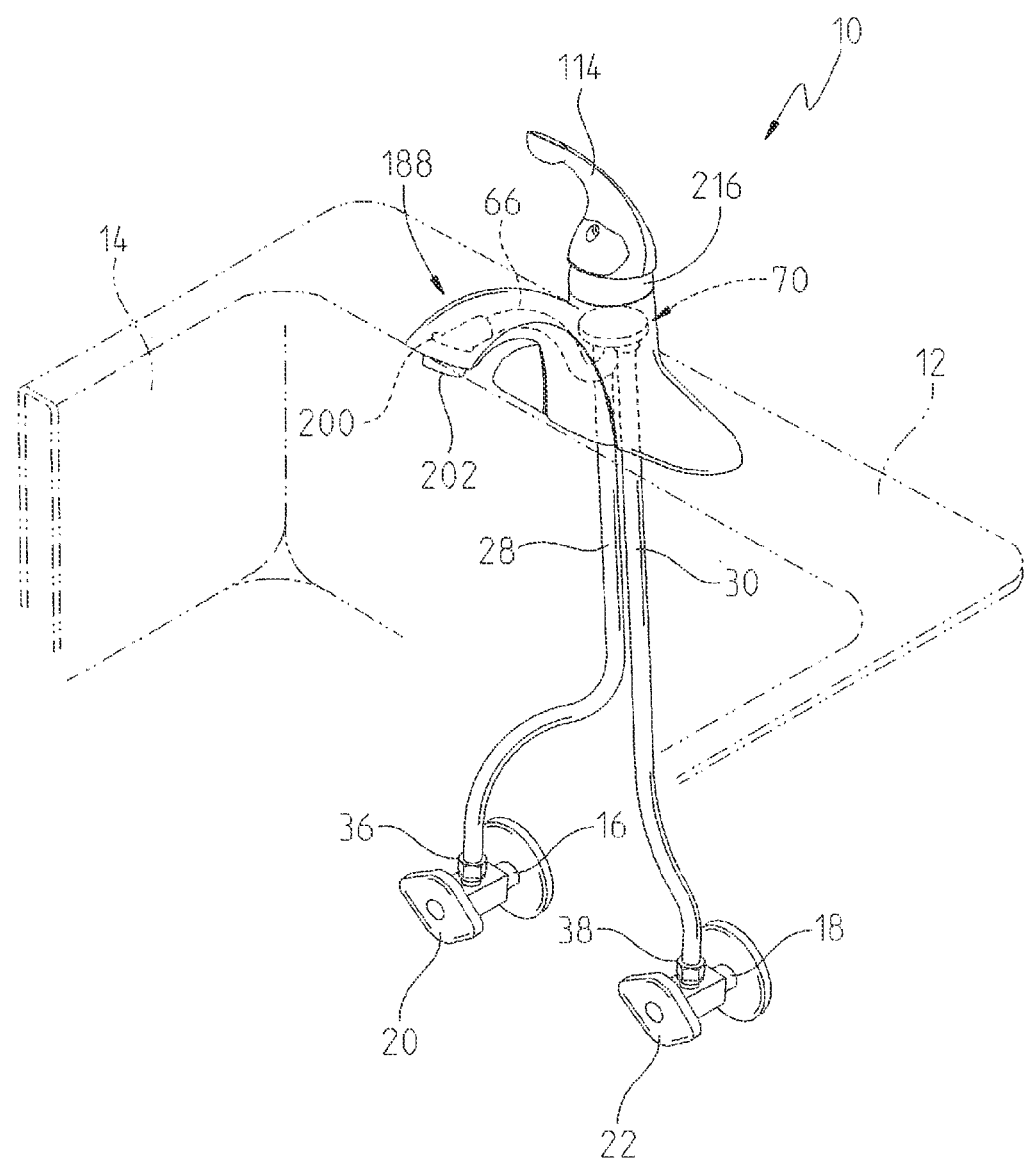
FIG. 1B is a perspective view similar to FIG. 1A, showing another illustrative fluid coupling to hot and cold water supply lines.
Figure 1C:
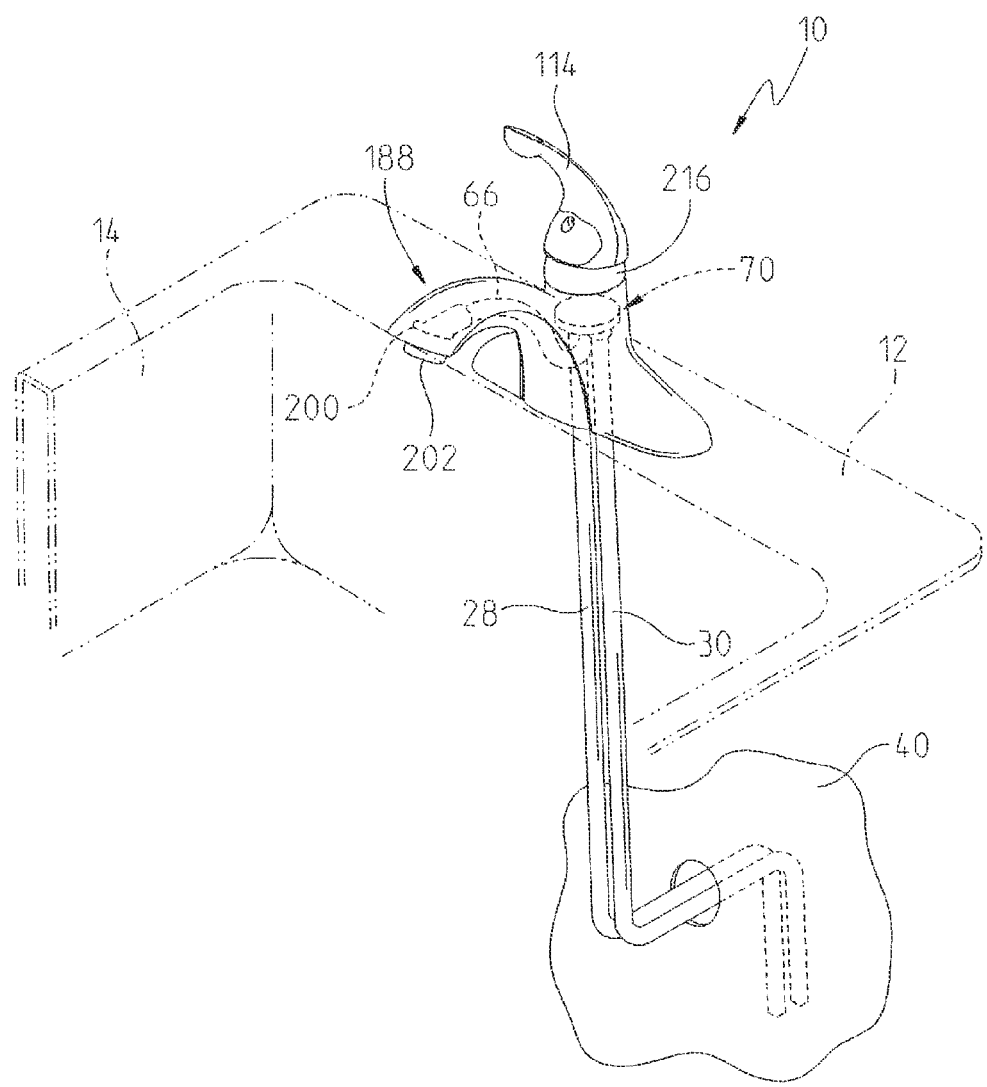
FIG. 1C is a perspective view similar to FIG. 1A, showing a further illustrative coupling to hot and cold water supply lines.

Referring initially to FIG. 1A, an illustrative embodiment faucet 10 is shown mounted to a sink or mounting deck 12 above a sink basin 14. The faucet 10 is fluidly coupled to hot and cold water supplies or sources 16 and 18 through conventional stops 20 and 22, respectively. Hot and cold water risers 24 and 26 may fluidly couple the stops 20 and 22 to hot and cold water inlet fluid transport components, or tubes 28 and 30, respectively. While FIG. 1 illustrates hot and cold water risers 24 and 26 coupled to inlet tubes 28 and 30 through fluid couplings 32 and 34, it should be appreciated that the inlet tubes 28 and 30 may extend uninterrupted from the faucet 10 to the stops 20 and 22 through fluid couplings 36 and 38, as shown in FIG. 1B. Additionally, FIG. 1C shows an illustrative embodiment where inlet tubes 28 and 30 are coupled behind the wall 40 to the plumbing system of the building or house.

Referring further to FIGS. 2-6, the faucet 10 includes a holder 42 configured to be secured to the sink deck 12. The holder 42 includes a pair of downwardly extending legs 44 and 46, illustratively comprising hollow tubes having external threads 48 and 49, respectively. Securing members, illustratively nuts 50 and 51 are threadably received by threads 48 and 49 of legs 44 and 46. The nuts 50 and 51 are configured to secure the holder 42 to the sink deck 12. Supports 52 and 54 are coupled to the upper ends of legs 44 and 46 and are connected by a bridge member 56. The bridge member 56, in turn, supports a stand 58 in spaced relation above the supports 52 and 54.

Figure 5:
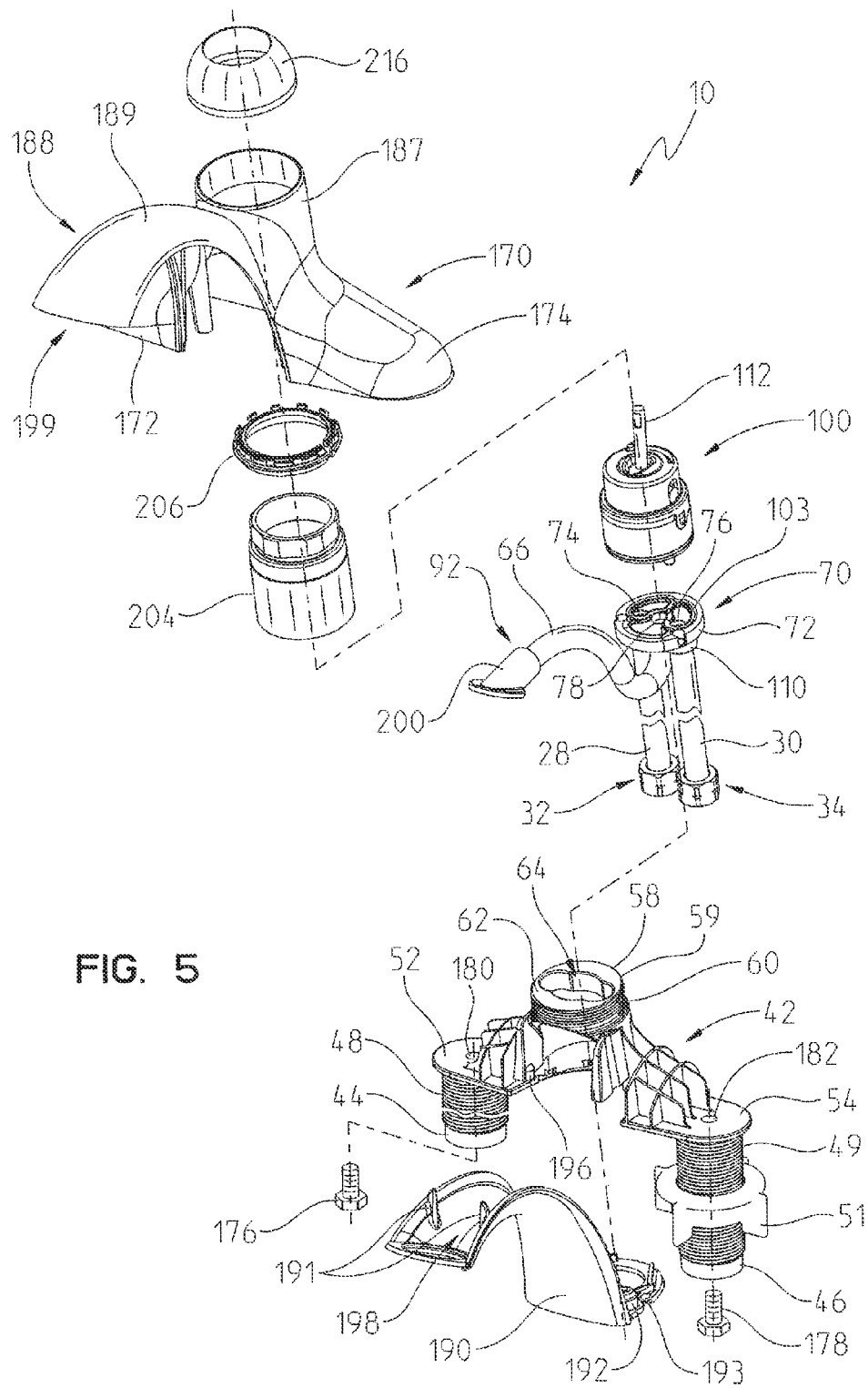
FIG. 5 is an exploded perspective view, with a partial cut-away, of the faucet of FIG. 2.

With further reference to FIG. 5, the stand 58 illustratively includes a cylindrical outer wall 59 supporting a plurality of external threads 60. An upper end of the wall 59 supports a platform 62 surrounding a longitudinal opening 64. In one illustrative embodiment, the holder 42 is molded from a polymer, such as a long-fiber reinforced thermoplastic (LFRT) exhibiting high dimensional stability and strong mechanical properties. One such LFRT is Celstran® available from Ticona of Florence, Ky. However, it should be noted that the holder 42 may be formed of other suitable materials, such as stainless steel or brass.

Figure 4:
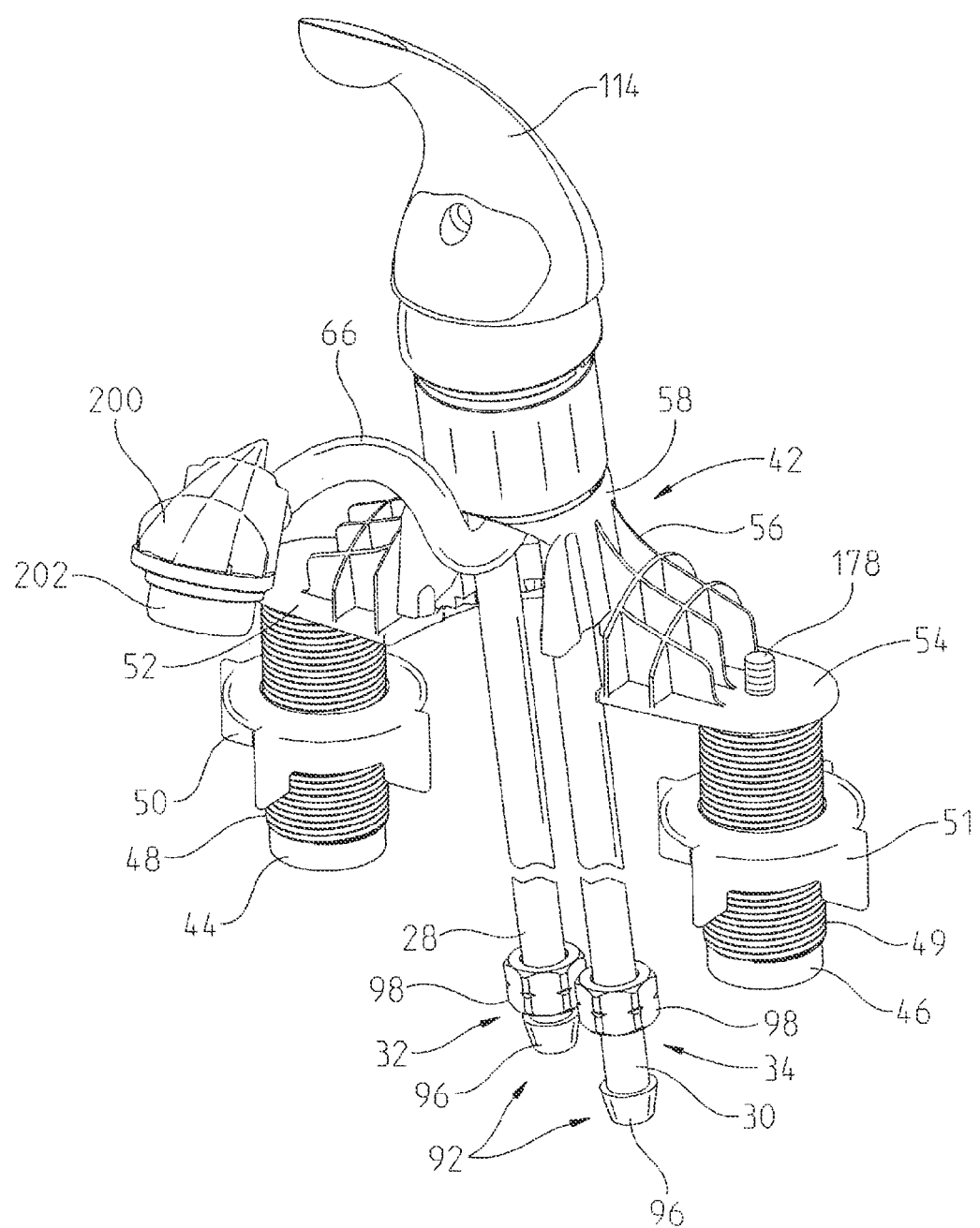
FIG. 4 is a perspective view similar to FIG. 3, with the undercover removed to reveal additional details of the molded waterway assembly.
Figure 7:
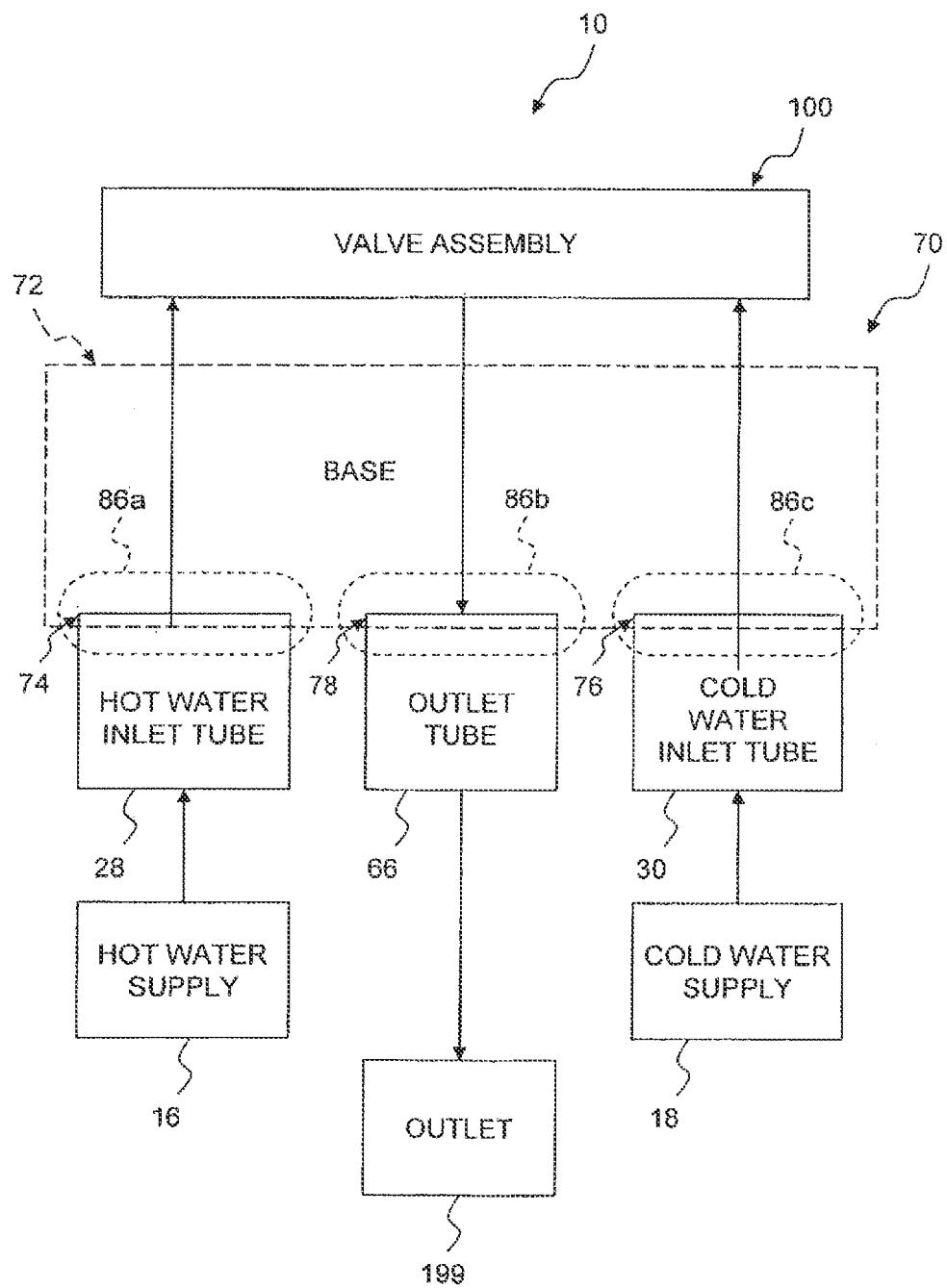
FIG. 7 is a diagrammatic view of an illustrative embodiment faucet showing a molded waterway assembly coupled to a valve assembly.
Figure 10:
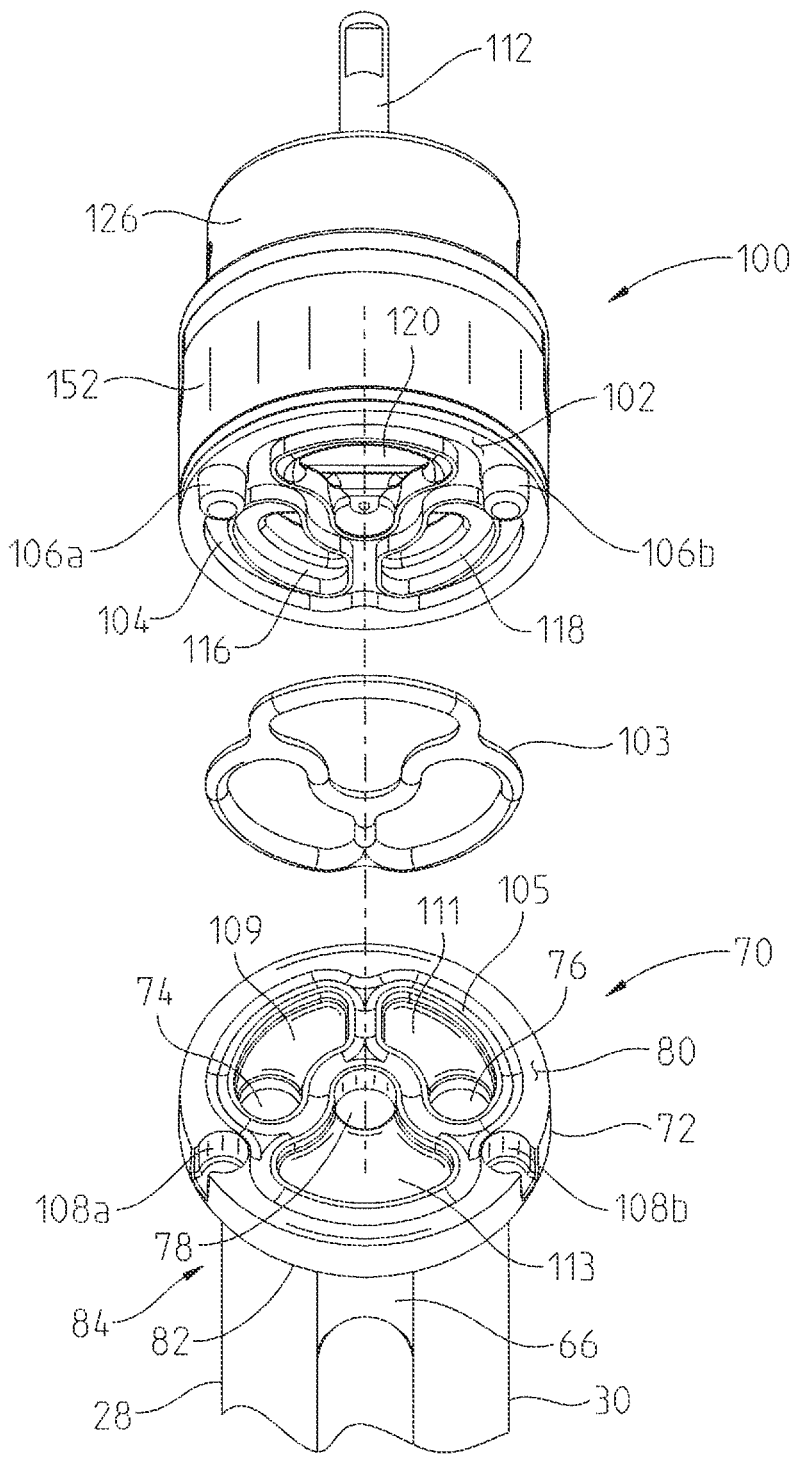
FIG. 10 is a partial exploded perspective view of the faucet of FIG. 2, showing the interface between the molded waterway assembly and the valve body.

With reference to FIGS. 4, 5, and 7, a molded waterway assembly 70 is supported by the stand 58 of holder 42. The molded waterway assembly 70 illustratively includes a valve interface member or base 72 in the form of a puck or disk having a hot water inlet opening 74, a cold water inlet opening 76, and an outlet opening 78, all extending between upper and lower surfaces 80 and 82 (FIG. 10). The hot water inlet tube 28, the cold water inlet tube 30, and an outlet tube 66 are fluidly coupled to the openings 74, 76, and 78, respectively, in the base 72. As detailed herein, the tubes 28, 30, and 66 are illustratively formed of a flexible non-metallic material, such as a polymer.

In the illustrative embodiment, the tubes 28, 30, 66 and the base 72 are formed of compatible materials, such as polymers, and illustratively of cross-linkable materials. As such, the waterway assembly 70 is illustratively electrically non-conductive. As used within this disclosure, a cross-linkable material illustratively includes thermoplastics and mixtures of thermoplastics and thermosets. In one illustrative embodiment, the tubes 28, 30, 66 and the base 72 are formed of a polyethylene which is subsequently cross-linked to form cross-linked polyethylene (PEX). However, it should be appreciated that other polymers may be substituted therefor. For example, the waterway assembly 70 may be formed of any polyethylene (PE) (such as raised temperature resistant polyethylene (PE-RT)), of polypropylene (PP)(such as polypropylene random (PPR)), or of polybutylene (PB). It is further envisioned that the waterway assembly 70 could be formed of cross-linked polyvinyl chloride (PVCX) using silane free radical initiators, of cross-linked polyurethane, or of cross-linked propylene (XLPP) using peroxide or silane free radical initiators.

Figure 9:
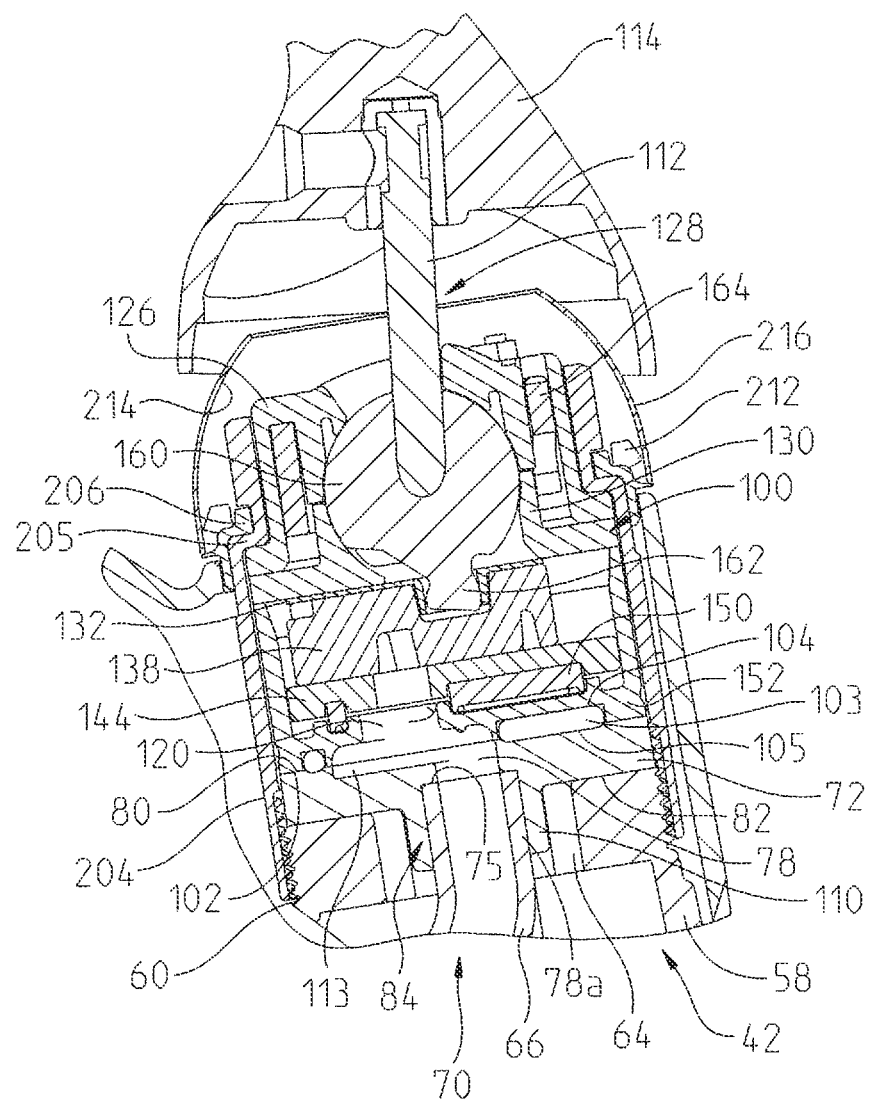
FIG. 9 is a detailed cross-sectional view of FIG. 8.
Figure 11:
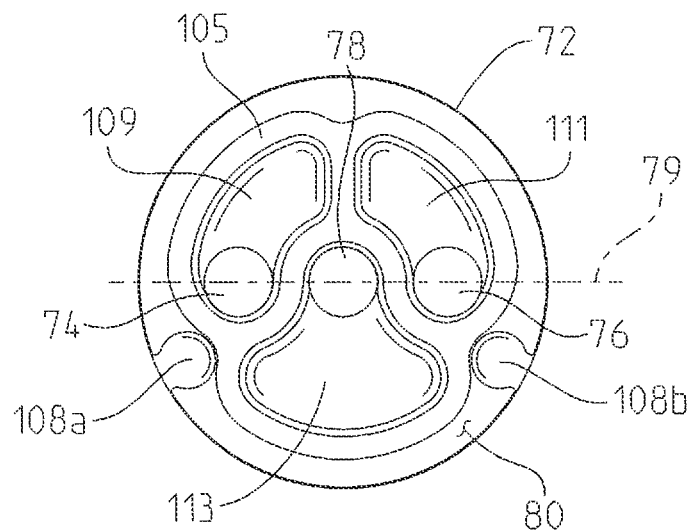
FIG. 11 is a top plan view of the base of the molded waterway assembly.
Figure 12:
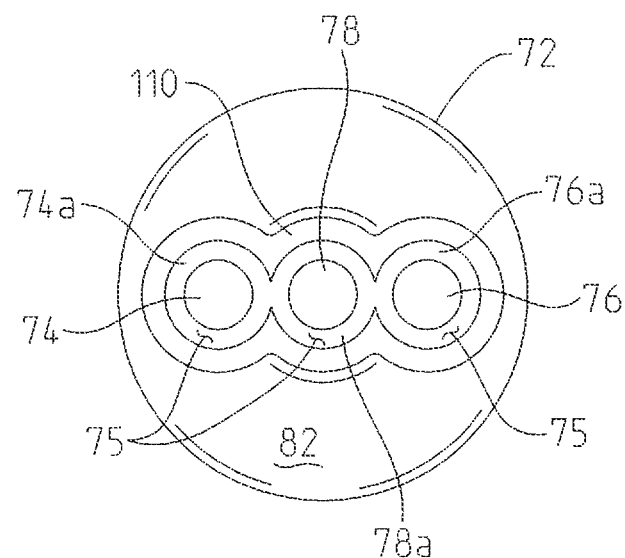
FIG. 12 is a bottom plan view of the base of molded waterway assembly.

With reference to FIGS. 9, 10, and 12, the upper ends 84 of tubes 28, 30, and 66 are positioned within the openings 74, 76, and 78 of the base 72. Each opening 74, 76, and 78 includes a counterbore 74a, 76a, and 78a extending upwardly from the lower surface 82 and defining a stop surface 75 which cooperates with the upper ends 84 of the tubes 28, 30, and 66, respectively. In the illustrative embodiment, the base 72 is overmolded around the upper ends 84 of the tubes 28, 30, and 66. More particularly, the base 72 is formed of a polymer which is molded over the previously formed tubes 28, 30, and 66, in the manner detailed herein. The overmold base 72 partially melts the upper ends 84 of the tubes, forming couplings or bonds 86a, 86b, 86c between material of the base 72 and material of the tubes 28, 30, and 66 (shown diagrammatically in FIG. 7). To facilitate the molding process, the openings 74, 76, and 78, and thus tubes 28, 30, and 66, are illustratively aligned along a common center axis 79 (FIG. 11). Flow directing channels 109, 111, and 113 are formed within upper surface 90 of the base 72 and are configured to facilitate fluid flow through openings 74, 76, and 78, respectively (FIGS. 10 and 11).

As shown in FIGS. 9 and 12, a support or reinforcing boss 110 illustratively extends downwardly from the lower surface 82 of the base 72 and surrounds the openings 74, 76, and 78. The boss 110 provides additional support to the tubes 28, 30, and 66 coupled to the base 72.

In the illustrative embodiment detailed herein, the base 72 is formed of polyethylene which has been overmolded around the tubes 28, 30, and 66 and subsequently cross-linked. It should be noted that reinforcing members, such as glass fibers, may be provided within the polyethylene of the base 72. While a polymer, such as cross-linkable polyethylene, is the illustrative material for the base 72, in certain embodiments other materials may be substituted therefore, such as brass or copper. Additionally, the tubes 28, 30, and 66 may be fluidly coupled to the base 72 in a variety of manners other than through overmolding, such as ultrasonic welding or heat staking.

Figure 13:
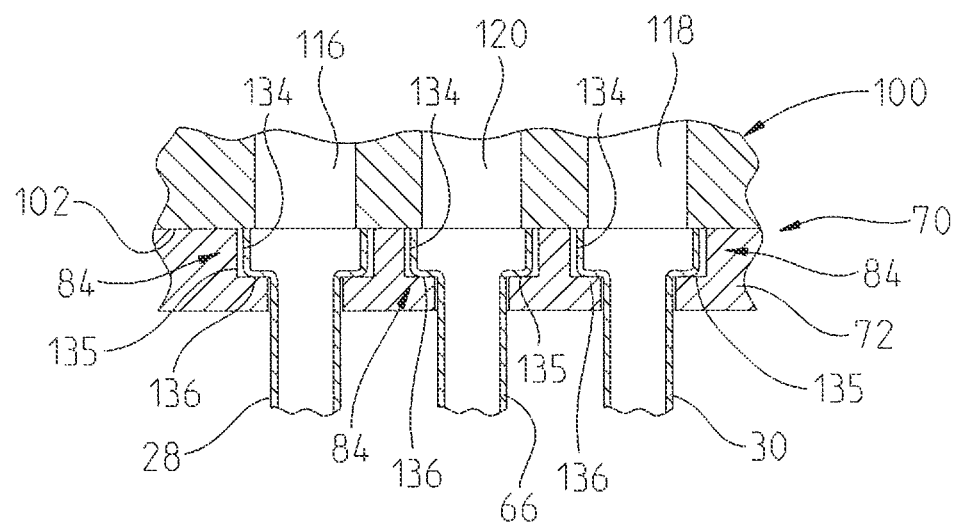
FIG. 13 is a diagrammatic cross-sectional view showing another illustrative fluid coupling arrangement for the waterway assembly.
Figure 14:
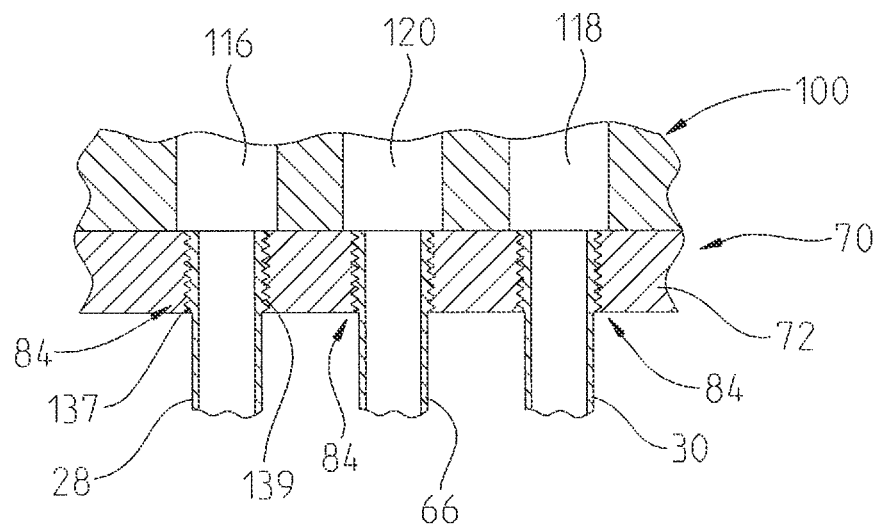
FIG. 14 is a diagrammatic cross-sectional view similar to FIG. 13, showing a further illustrative fluid coupling for the waterway assembly.

With reference now to FIGS. 13 and 14, illustrative alternative means for coupling the tubes 28, 30, and 66 are shown. For example, in FIG. 13, the upper ends 84 of tubes 28, 30, and 66 include an enlarged portion 134 configured to be received within cooperating counterbores 135 formed within base 72. As may be appreciated, each enlarged portion 135 is retained intermediate a lip 136 formed within counterbore 135 of the base 72 and the lower surface 102 of the valve assembly 100. The enlarged portion 135 may illustratively be formed integral with each tube 28, 30, 66, or as a separate component, such as an overmold. As shown in the further illustrative embodiment of FIG. 14, the upper ends 84 of the tubes 28, 30, and 66 may include external threads 137 which threadably engage internal threads 139 formed within base 72.

As detailed herein, the base 72 of the waterway assembly 70 is illustratively secured to the tubes through overmolding. The basic principle of overmolding plumbing connections on the tubes is well known. Exemplary overmolds are shown in U.S. Pat. No. 5,895,695, U.S. Pat. No. 6,082,780, U.S. Pat. No. 6,287,501, and U.S. Pat. No. 6,902,210 each listing William W. Rowley as an inventor, the disclosures of which are all expressly incorporated by reference herein.

In the present method, the tubes 28, 30, and 66 are illustratively positioned within a mold (not shown) wherein pins or mandrels slide into each respective tube end 84 to prevent collapsing thereof during the injection molding process. The mold receives the parallel aligned ends of the tubes 28, 30, and 66 and then receives a flowable polymer, illustratively polyethylene, which forms the appropriate base 72. As further detailed herein, the upper ends 84 of the tubes 28, 30, 66 are aligned along a common axis 79 to facilitate opening and closing of portions of the mold. After the polymer sufficiently hardens, the mold is opened to release the base 72 and tubes 28, 30, and 66. Through overmolding, the end 84 of each tube 28, 30, and 66 partially melts and bonds with the overmolded material of the base 72 through couplings 86a, 86b, and 86c. This makes a substantially monolithic waterway assembly 70.

As is known, polyethylene is flexible, or semi-rigid, and may be cross-linked to form PEX. Cross-linking polyethylene couples the individual molecule chains together and prevents splitting. The curing or cross-linking process may use any one of several different technologies to form, for example, PEX-A, PEX-B or PEX-C. PEX-A is formed by using peroxide to cross-link polyethylene. More particularly, PEX-A is formed of a polyethylene having incorporated therein peroxide. Upon heating the peroxide polyethylene above the decomposition temperature of the peroxide, "free" radicals are produced to initiate the cross-linking process. PEX-B is formed by using silane to cross-link polyethylene. PEX-B is formed by using silane-grafted polyethylene which is then "moisture-cured" by exposure to heat and water, also known as sauna curing. PEX-C is formed of polyethylene which is cross-linked by bombarding it with electromagnetic (gamma) or high energy electron (beta) radiation.

By overmolding, it is possible to obtain a material to material bond, thereby providing a substantially leak-proof coupling between the tubes 28, 30, and 66 and the base 72. The resulting overmolded waterway assembly 70 is then cross-linked by means known in the art, e.g., peroxide cross-linking, silane cross-linking, radiation cross-linking, etc. More particularly, and as detailed above, cross-linking can be performed by a silane process or a peroxide process, or combinations thereof, wherein cross-linking is completed in a hot bath. Each process has a cross-linking catalyst that causes the polymer to crosslink when certain temperature and pressure and/or humidity are used. In the illustrative embodiment, the waterway assembly (i.e., waterway assembly 70) is passed under a radiation unit and the exposure causes cross-linking. While illustratively the final product 70 is cross-linked, in certain circumstances it might be appropriate to cross-link individual components 28, 30, 66, and 72. In a further illustrative embodiment, the material for the base 72 may be partially cross-linked prior to overmolding, followed by further cross-linking after coupling to the tubes 28, 30, and 66.

Figure 2:
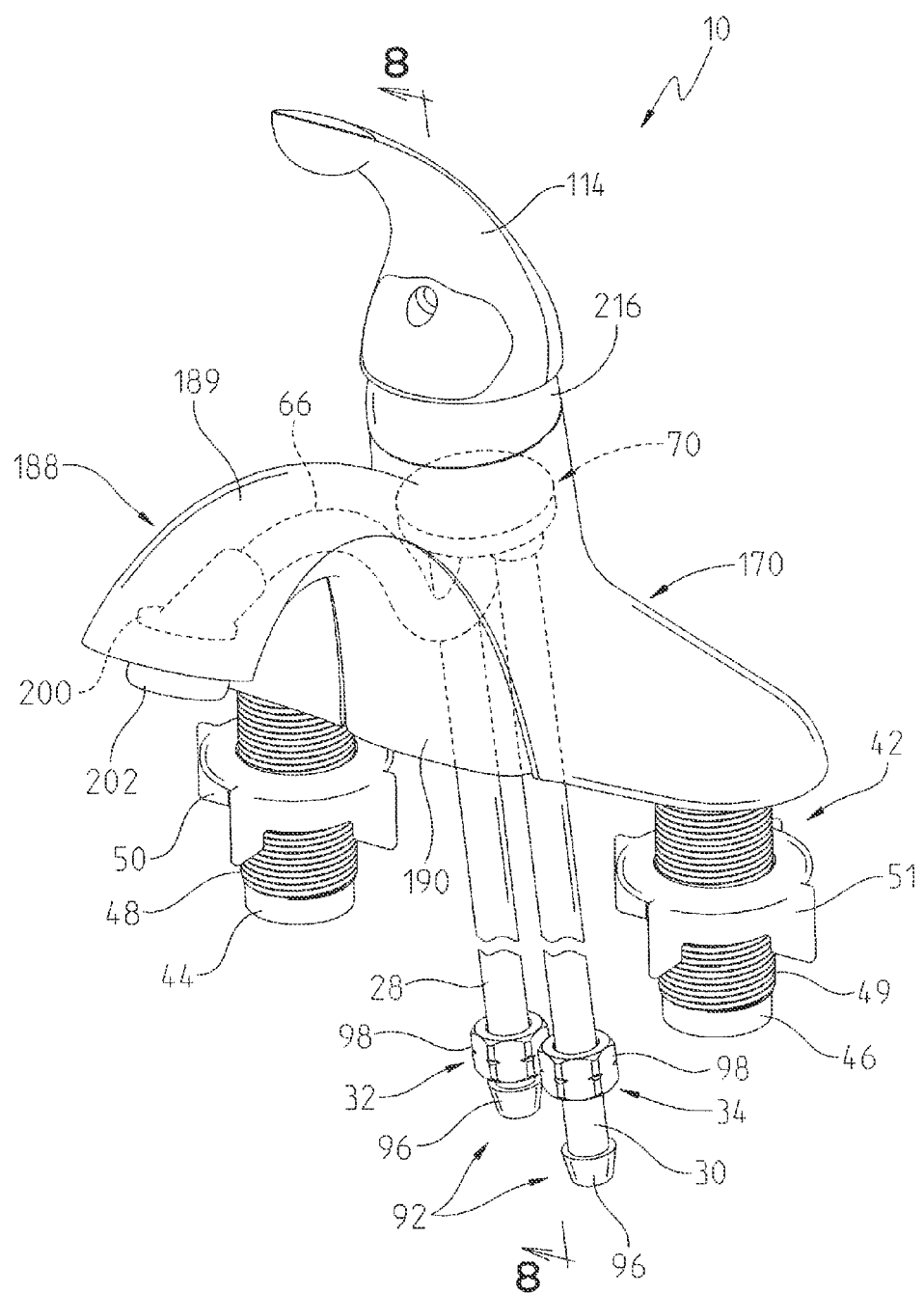
FIG. 2 is a perspective view of the faucet of FIG. 1.
Figure 3:
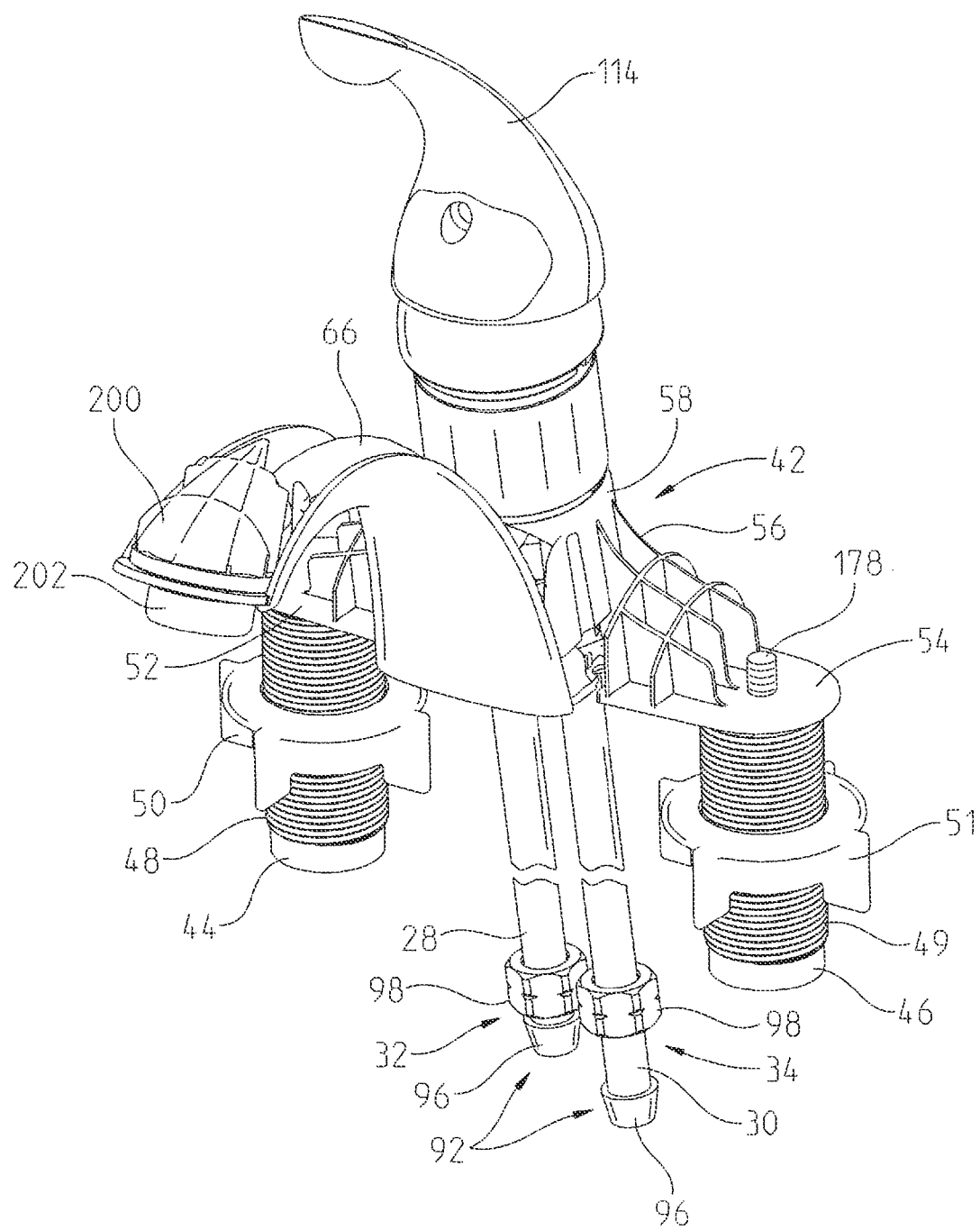
FIG. 3 is a perspective view similar to FIG. 2, with the escutcheon removed to show the molded waterway assembly, the holder, and the valve assembly.

With reference to FIG. 2, the second ends 92 of each inlet tube 28 and 30 illustratively includes a fluid coupling 94, which may define couplings 32 and 34 shown in FIG. 1. Illustratively, each fluid coupling 94 includes an overmolded coupler 96 and cooperating internally threaded nut 98. Additional details regarding illustrative overmolded fluid couplings is provided in U.S. Pat. Nos. 5,895,695 and 6,287,501, the disclosures of which are expressly incorporated by reference herein.

In one illustrative embodiment, the tubes 28, 30, and 66 may include certain additional features, such as corrugated walls for improved flexibility, as detailed in U.S. Patent Application Publication No. US 2008/0178957, published Jul. 31, 2008, entitled "TUBE ASSEMBLY," the disclosure of which is expressly incorporated by reference herein.

With reference to FIGS. 5, 9, and 10, a valve assembly 100 is supported by the base 72 of the molded waterway assembly 70. More particularly, a lower surface 102 of the valve assembly 100 sealingly engages a seal, illustratively a silicone gasket 103 received intermediate the base 72 and the valve assembly 100. The gasket 103 is received within a channel 104 formed within lower surface 102 of the valve assembly 100 and seals against a seat 105 formed by the upper surface of the base 72 (FIG. 10). The gasket 103 extends around the flow directing channels 109, 111, and 113.

As shown in FIG. 10, first locating elements, illustratively locating pegs 106a and 106b, are positioned on the bottom of the valve assembly 100 and extend downwardly from the lower surface 102. The pegs 106a and 106b are configured to be received within second locating elements, illustratively recesses 108a and 108b, formed within the upper surface 80 of the base 72. The position of the pegs 106 within the recesses 108 facilitates proper orientation of the valve assembly 100 relative to the molded waterway assembly 70 and hence, alignment with the tubes 28, 30, and 66 and respective openings 74, 76, and 78, with appropriate ports 116, 118, and 120 of the valve assembly 100. Engagement between the pegs 106 and the recesses 108 may also improve resistance to torque generated between the valve assembly 100 and the base 72.

As shown in FIGS. 9 and 10, the valve assembly 100 illustratively includes a stem 112 that may be actuated by a handle 114 to selectively allow variable temperature and flow rate of water to be supplied to an outlet port 120 from a hot water inlet port 116 and a cold water inlet port 118. The base 72 of the waterway assembly 70 fluidly couples the hot water inlet port 116 to the hot water inlet tube 28, and fluidly couples the cold water inlet port 118 to the cold water inlet tube 30. The base 72 also fluidly couples the outlet port 120 to the outlet tube 66.

With further reference to FIG. 9, the valve assembly 100 illustratively includes an upper housing 126, a stem assembly 128, a coupling member 130, a carrier 132, an upper disc 138, a lower disc 144, a seal 150, and a lower housing 152. The stem assembly 128 illustratively includes a ball 160 molded from a thermoplastic material over a portion of the stem 112. A longitudinal extension or knuckle 162 extends downwardly from the ball 160. The ball 160 transmits motion of the stem 112 to the upper disc 138 through the extension 162 and the carrier 132.

The upper disc 138 is positioned on top of the lower disc 144 to control the mixing of hot and cold water and the flow rate of water through the valve assembly 100. Illustratively, both the upper and lower discs 138 and 144 are constructed of a ceramic material, however, any suitable material may be used, such as stainless steel.

In a further illustrative embodiment, a temperature limiting member 164 is received intermediate the coupling member 130 and the upper housing 126. The temperature limiting member 164 limits lateral pivoting movement of the stem 112 and the extension 162, and hence the maximum allowable temperature of water flowing through the valve assembly 100.

Additional details of an illustrative valve assembly are provided in U.S. patent application Ser. No. 11/494,889, filed Jul. 28, 2006, the disclosure of which is expressly incorporated by reference herein. While the illustrative valve assembly 100 is of a movable disc variety, it should be appreciated that other types of valve assemblies may be substituted therefor. For example, a ball-type mixing valve assembly may find equal applicability with the present invention. Illustrative ball-type valve assemblies are detailed in U.S. Pat. No. 4,838,304 to Knapp, U.S. Pat. No. 5,615,709 to Knapp, U.S. Pat. No. 5,927,333 to Grassberger, and U.S. Pat. No. 6,920,899 to Haenlein et al., the disclosures of which are expressly incorporated by reference herein.

Figure 6:
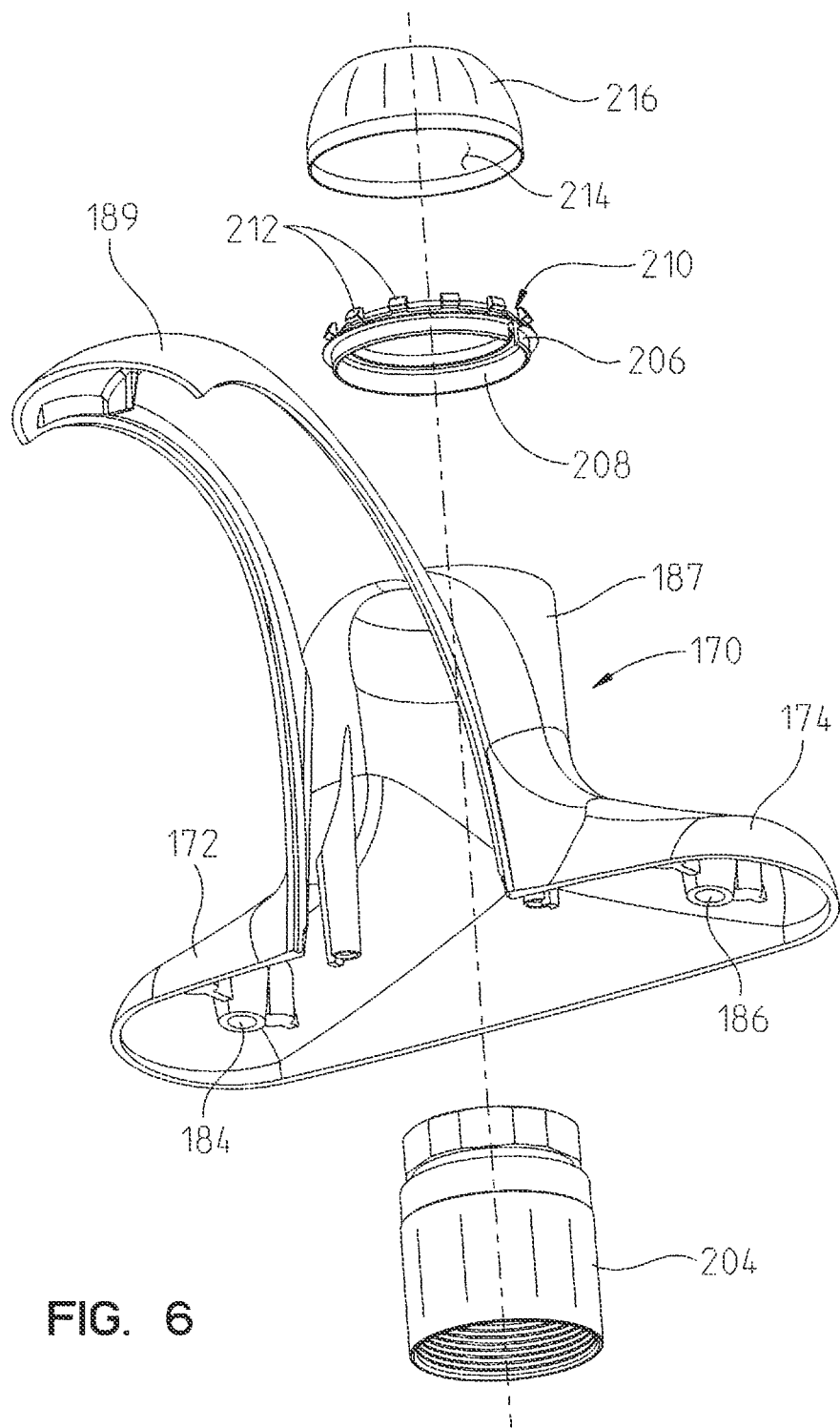
FIG. 6 is a partial exploded perspective view of the faucet of FIG. 2, showing the escutcheon, the bonnet, the guide ring, and the securing sleeve.

As shown in FIGS. 5 and 6, an upper housing or escutcheon 170 includes wing portions 172 and 174 which are received over the holder 42 and secured thereto through conventional fasteners. More particularly, hex bolts 176 and 178 are illustratively received within legs 44 and 46 and extend through apertures 180 and 182 formed in the supports 52 and 54 and up into threaded apertures 184 and 186 formed in the bottom of the wings 172 and 174. The valve assembly 100, the base 72, and the holder 42 are all received within a hub 187 of the escutcheon 170.

Figure 8:
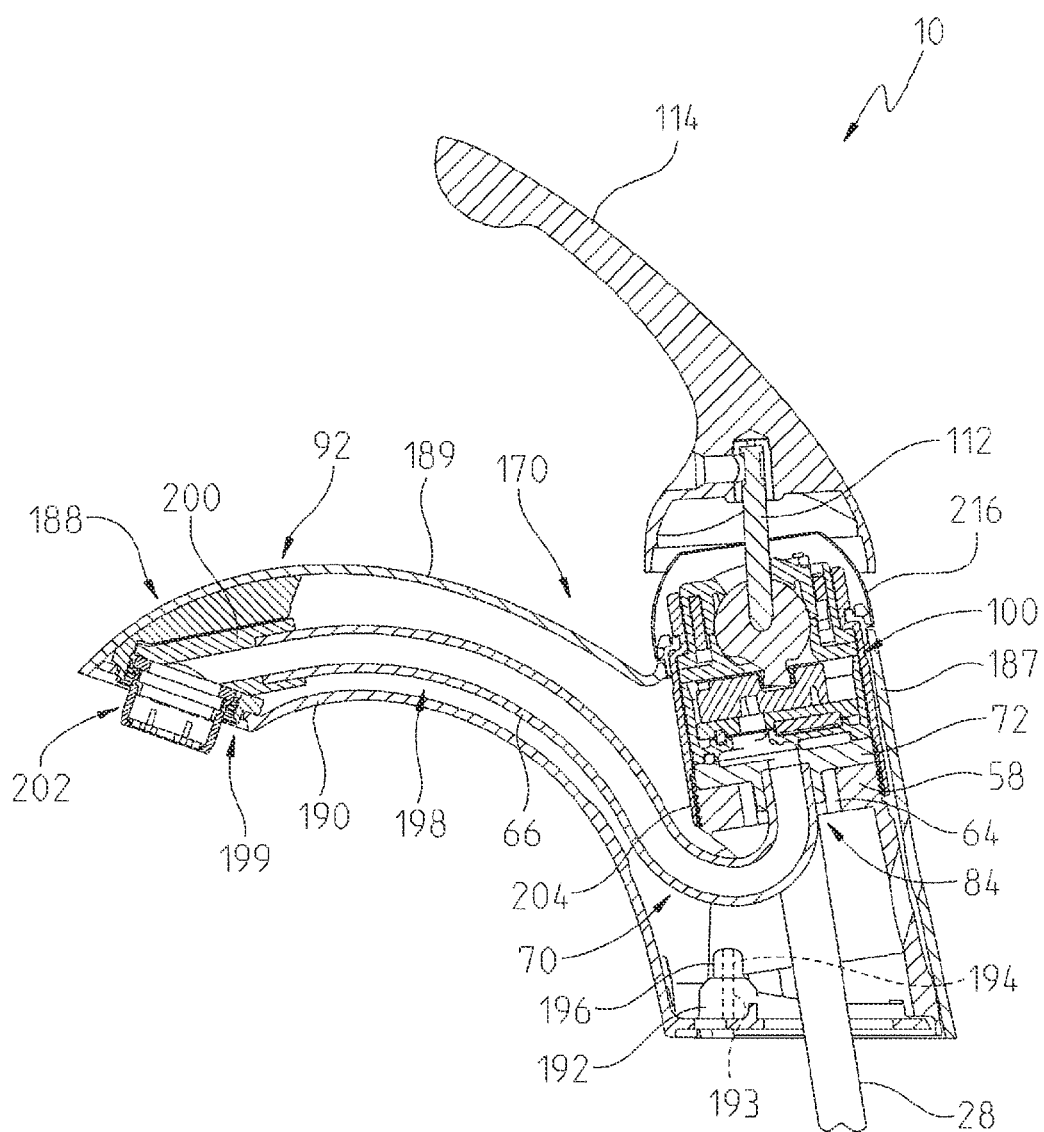
FIG. 8 is a cross-sectional view taken along line 8-8 of FIG. 2.

With reference to FIGS. 5 and 8, a spout 188 is formed by an upper spout member 189 of the escutcheon 170 and a lower spout or undercover member 190. The undercover member 190 is illustratively coupled to the upper spout member 189 through resilient snap fingers 191. A boss 192 having a central opening 193 on the undercover member 190 may be aligned with a cooperating opening 194 formed in a boss 196 of the holder 42. A fastener (not shown) may be received within the aligned openings 193 and 194 to further secure the undercover member 190 to the holder 42 (FIG. 8).

The undercover member 190 illustratively includes a channel 198 which receives a portion of the outlet tube 66. The channel 198 extends from the hub 187 of the escutcheon 170 to an outlet 199 of the spout 188. The outlet tube 66 rests in channel 198 when the spout 188 is assembled. More particularly, upper spout member 189 conceals the channel 198 from the view of an outside observer.

In one illustrative embodiment, the spout 188 is formed of a non-metallic material. More particularly, the upper spout member 189 and the undercover member 190 may be molded from a polymer, such as a thermoplastic or a cross-linkable material, and illustratively a cross-linkable polyethylene (PEX). Further illustrative non-metallic materials include polybutylene terephthalate (PBT) and thermosets, such as polyesters, melamine, melamine urea, melamine phenolic, and phenolic. Of course, the spout 188 may be formed of traditional metallic materials, such as zinc or brass. Additional details of a further illustrative embodiment spout is disclosed in U.S. Pat. No. 7,717,133, issued May 18, 2010, entitled "SPOUT TIP ATTACHMENT," the disclosure of which is expressly incorporated by reference herein.

As detailed herein, a first end 84 of the outlet tube 66 is coupled to the base 72 of the waterway assembly 70. The second end 92 of the outlet tube 66 is illustratively coupled to an overmold component 200. The overmold component 200 provides an interface including a sealing surface and is operably coupled to an aerator assembly 202 (FIG. 8). Additional details concerning the overmold component 200 are provided in U.S. Pat. No. 7,748,409, issued Jul. 6, 2010, entitled "OVERMOLD INTERFACE FOR FLUID CARRYING SYSTEM," the disclosure of which is expressly incorporated by reference herein.

With reference to FIGS. 5 and 9, a locking sleeve or nut 204 is received over the valve assembly 100 and waterway base 72, and threadably engages with the external threads 60 of the holder 42. As shown in FIG. 9, lip 205 of locking sleeve 204 forces the valve assembly 100 toward the base 72 of the waterway assembly 70, thereby compressing the gasket 103 for effecting a seal therebetween.

Referring now to FIGS. 5, 6 and 9, a guide ring 206 is concentrically received over the locking sleeve 204. The guide ring 206 includes a resilient body 208 having a slit 210 formed therein. A plurality of retaining tabs 212 extend upwardly from the body 208. The retaining tabs 212 of the guide ring 206 are configured to frictionally engage with an inside surface 214 of a bonnet 216 to retain the bonnet 216 in a fixed position relative to the locking sleeve 204.

Figure 15:
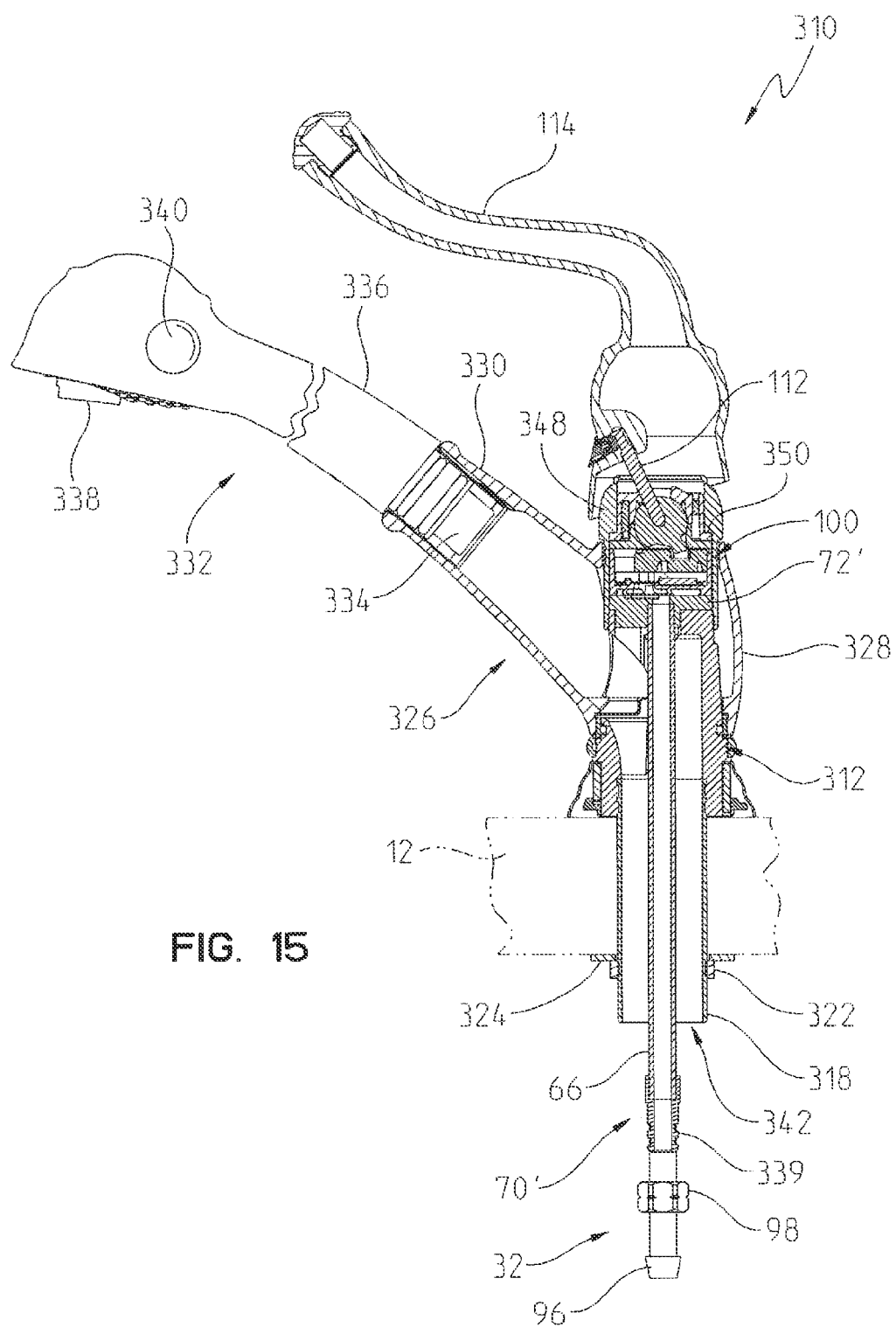
FIG. 15 is a side elevational view, in partial cross-section, of a further illustrative embodiment faucet of the present disclosure.
Figure 16:
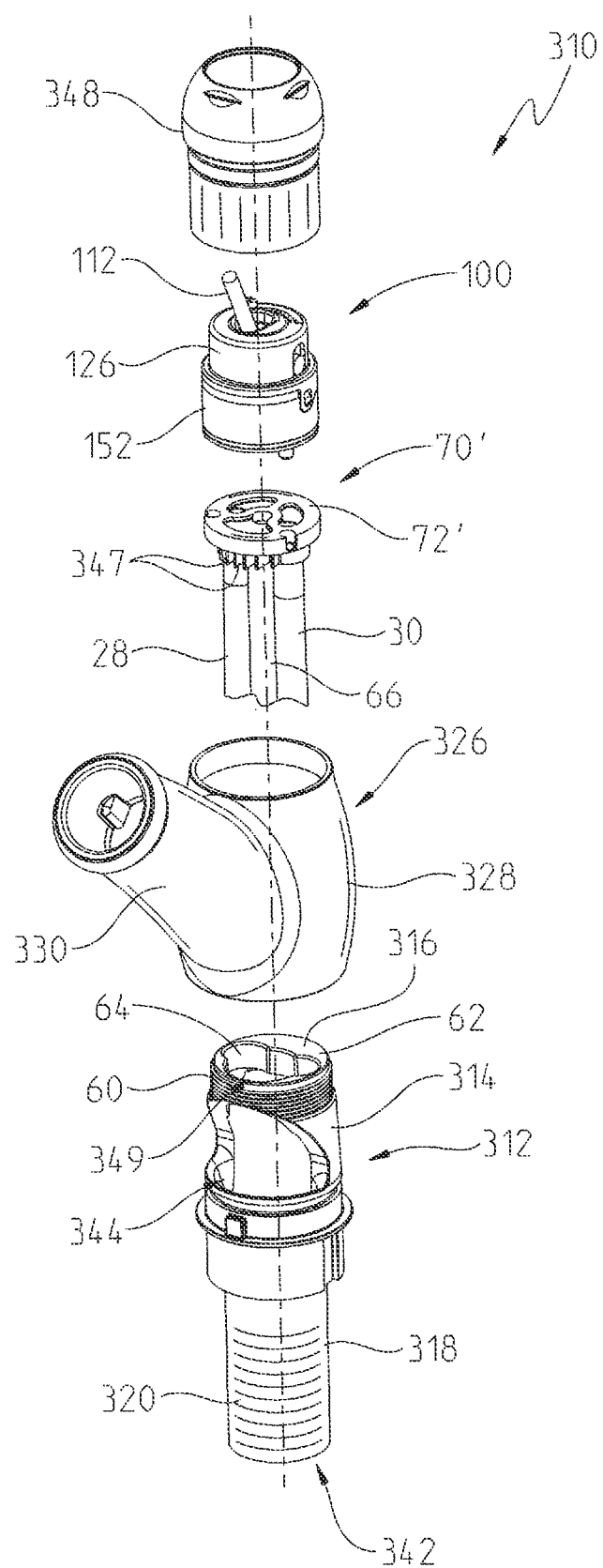
FIG. 16 is a partial exploded perspective view of the faucet of FIG. 15.

Referring now to FIGS. 15 and 16, a further illustrative embodiment faucet 310 is shown. The faucet 310 includes many of the same features identified above with respect to faucet 10. As such, similar components are identified with like reference numbers.

The faucet 310 includes a holder 312 having a cylindrical outer wall 314 supporting a stand 316. A securing member, illustratively a conduit 318 having external threads 320, extends downwardly from the holder 312. A nut 322 and washer 324 may threadably engage the threads 320 of the conduit 318 for securing the holder 312 to the sink deck 12. The stand 316 includes a plurality of external threads 60 and a platform 62 surrounding a longitudinal opening 64.

The holder 312 may be overmolded to an upper end 325 of the conduit 318. Alternatively, the holder 312 may be secured to the conduit 318 in other conventional manners, such as locking rings or threads. Illustratively, the holder 312 is formed from a polymer, such as Celstran®.

The holder 312 is received within an upper housing or escutcheon 326, illustratively formed of brass. The housing 326 includes a hub 328 and a spout portion 330. As shown in FIG. 13, the spout portion 330 is configured to slidably receive a conventional pull out wand 332. Illustratively, the pull out wand 332 is Model No. 473 available from Delta Faucet Company of Indianapolis, Ind. The pull out wand 332 includes a coupling portion 334 configured to be received within the spout portion 330, a body 336 connected to the coupling portion 334, and a spray head 338. The second end of the outlet tube 66 illustratively includes an overmolded coupling 339 which is configured to be fluidly coupled to the wand 332. The overmolded coupling 339 illustratively includes annular grooves 341 configured to receive sealing members, such as o-rings (not shown). The coupling 339 may be formed in a manner similar to couplings 96 detailed above. A button 340 may be provided on the wand 332 and is operably coupled to a diverter (not shown) to toggle between different modes of operation, such as a spray mode and a stream mode.

The molded waterway 70' is supported by the holder 312 and includes tubes 28, 30, and 66 overmolded to a base 72', in a manner similar to the molded waterway assembly 70 detailed above. The inlet tubes 28 and 30 are configured to extend through a lower opening 342 defined by the wall 314 of the stand. The outlet tube 66 is configured to extend through a side opening 344 formed within the wall 314 and to the outlet 346 of the spout portion 330.

Figure 20:
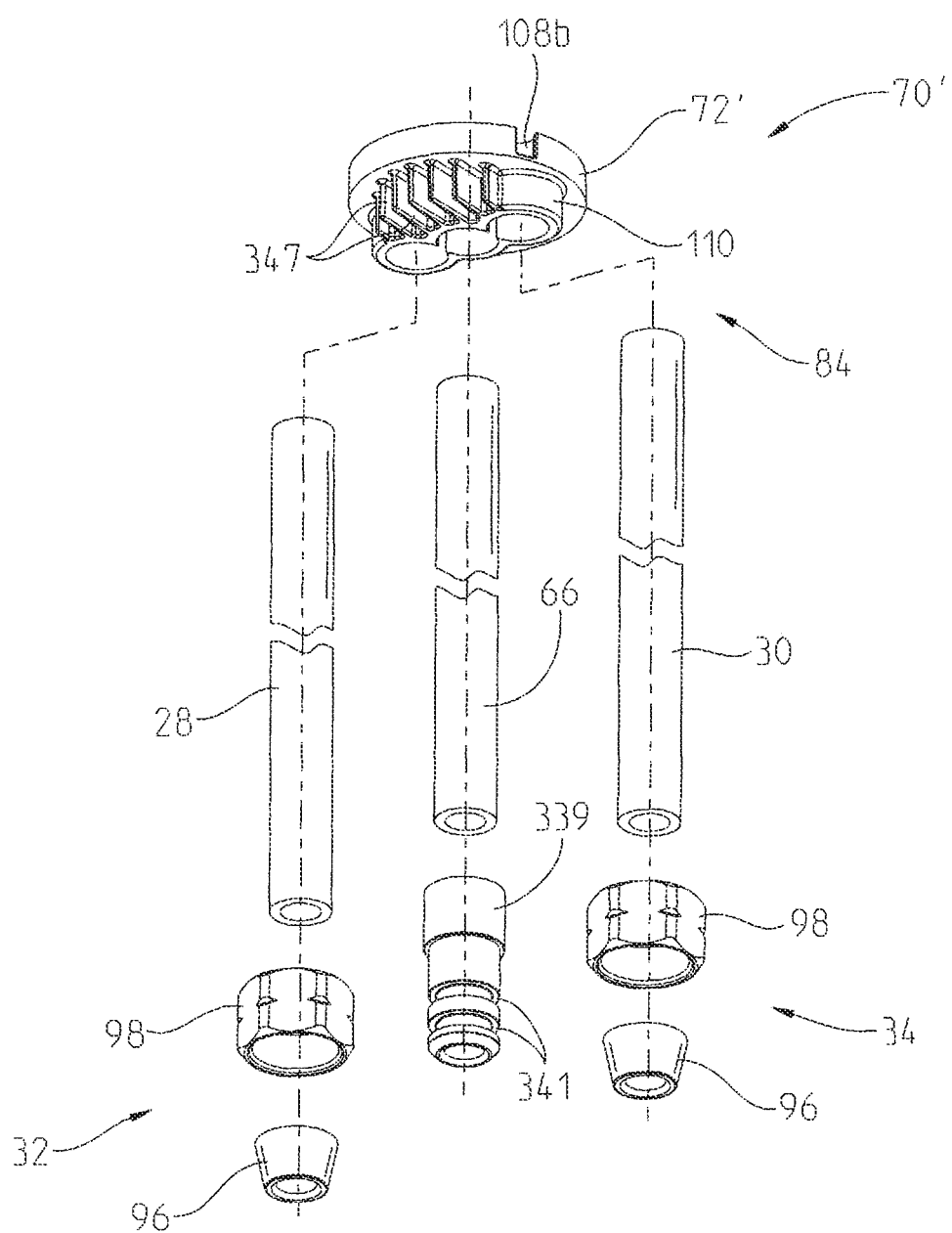
FIG. 20 is an exploded perspective view of the molded waterway assembly of FIG. 19.
Figure 21:
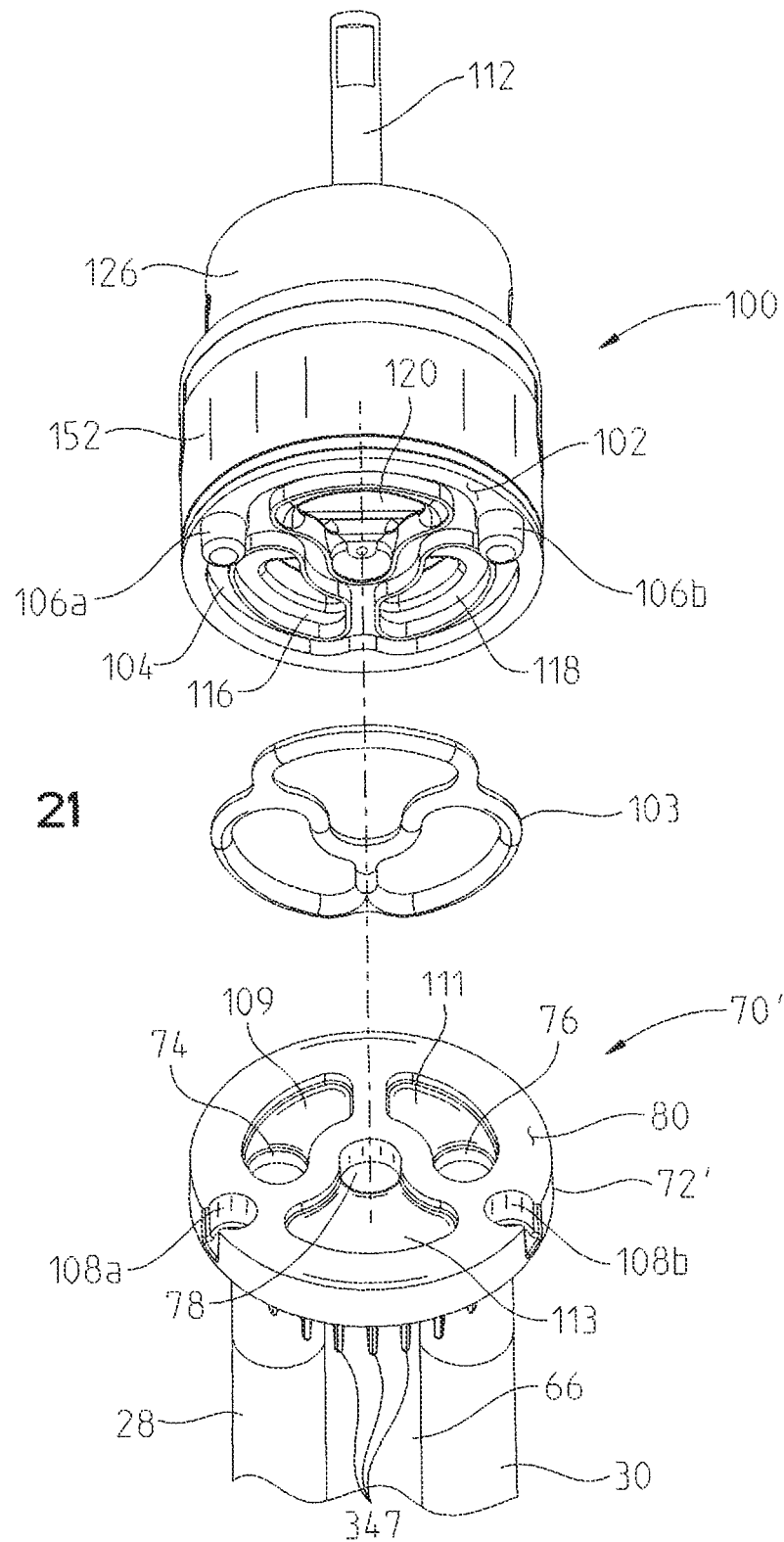
FIG. 21 is a partial exploded perspective view of the faucet of FIG. 15, showing the interface between the valve body and the molded waterway connection.
Figure 22:
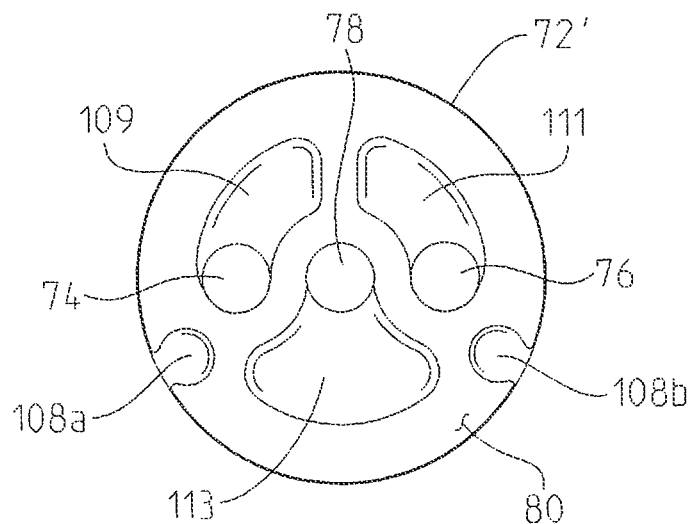
FIG. 22 is a top plan view of the base of the molded waterway assembly.
Figure 23:
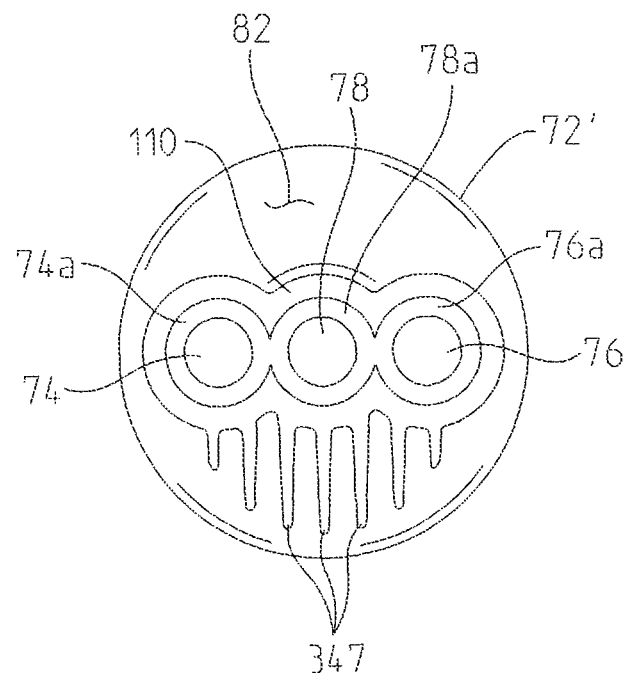
FIG. 23 is a bottom plan view of the base of the molded waterway assembly.

As shown in FIGS. 16, 20, and 23, a first registration element, illustratively a plurality of aligned ribs 347 extend downwardly from the lower surface 82 of the base 72'. The ribs 347 are configured to be received within a second registration element, illustratively a notch 349 formed within the stand 316 to facilitate proper orientation of the waterway assembly 70' relative to the holder 312 (FIG. 16). It should be appreciated that the base 72' may be registered relative to the stand 316 in a number of ways, including by providing the base 72' with an asymmetrical shape configured to cooperate with mating elements on the stand 316.

Figure 17:
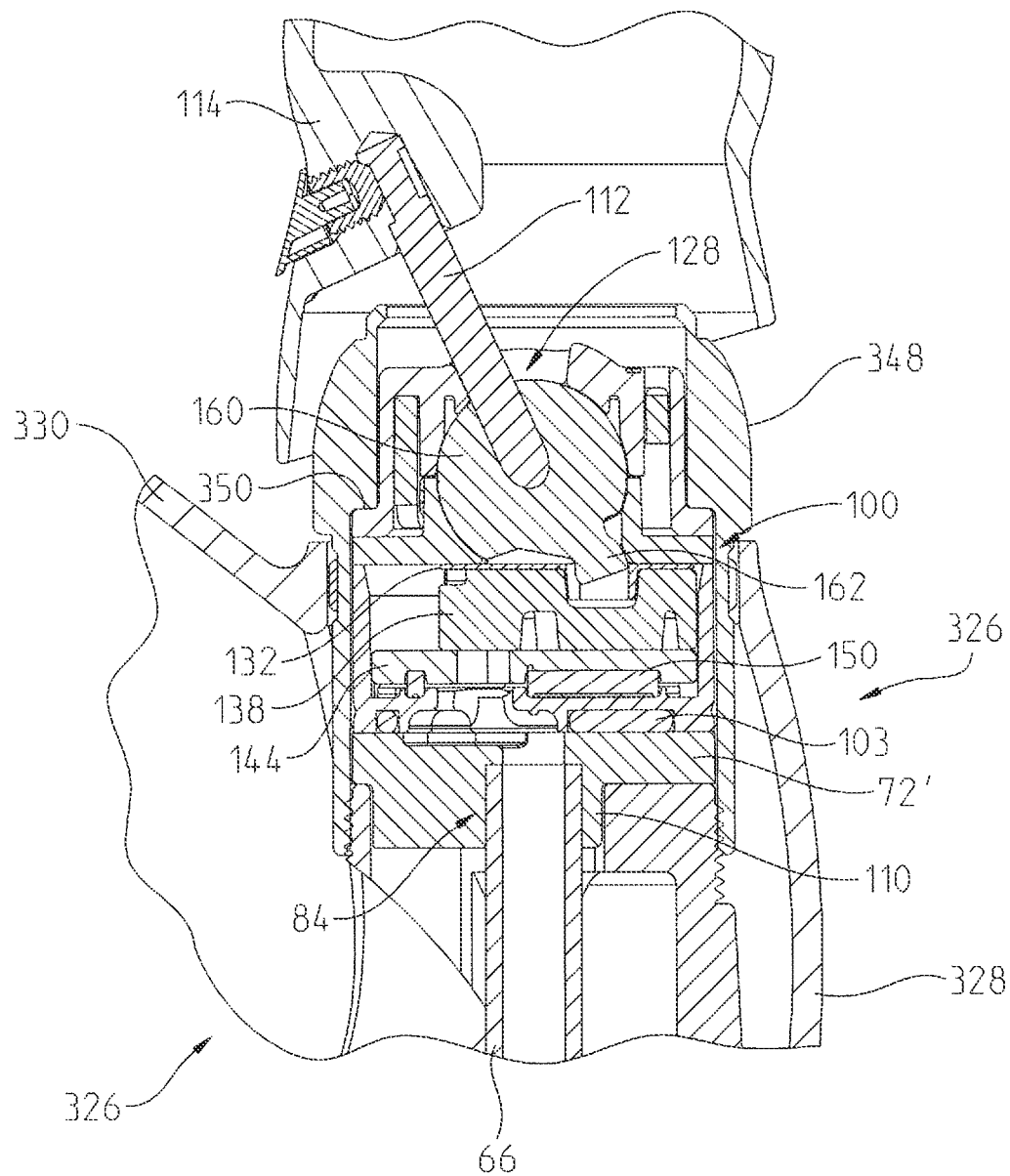
FIG. 17 is a detailed view of the cross-section of FIG. 15.
Figure 18:
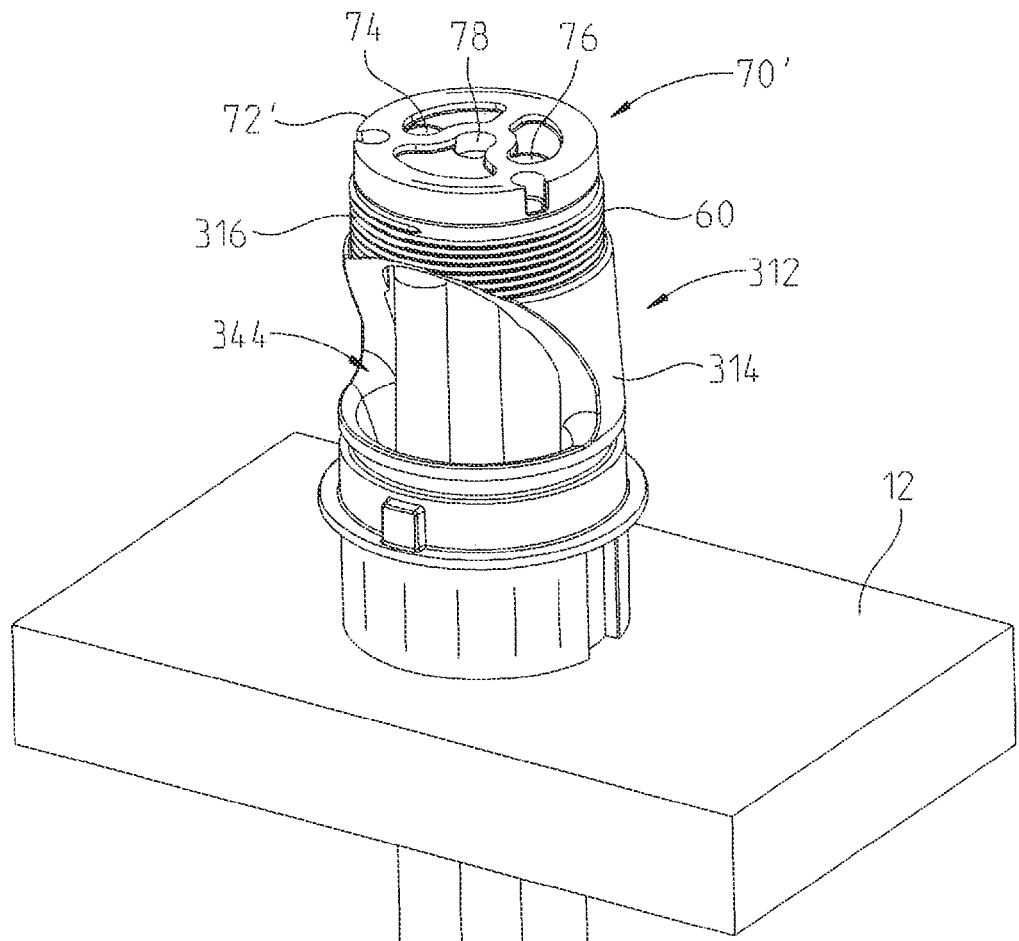
FIG. 18 is a perspective view showing the molded waterway assembly of the faucet of FIG. 15 supported by the sink deck.
Figure 19:
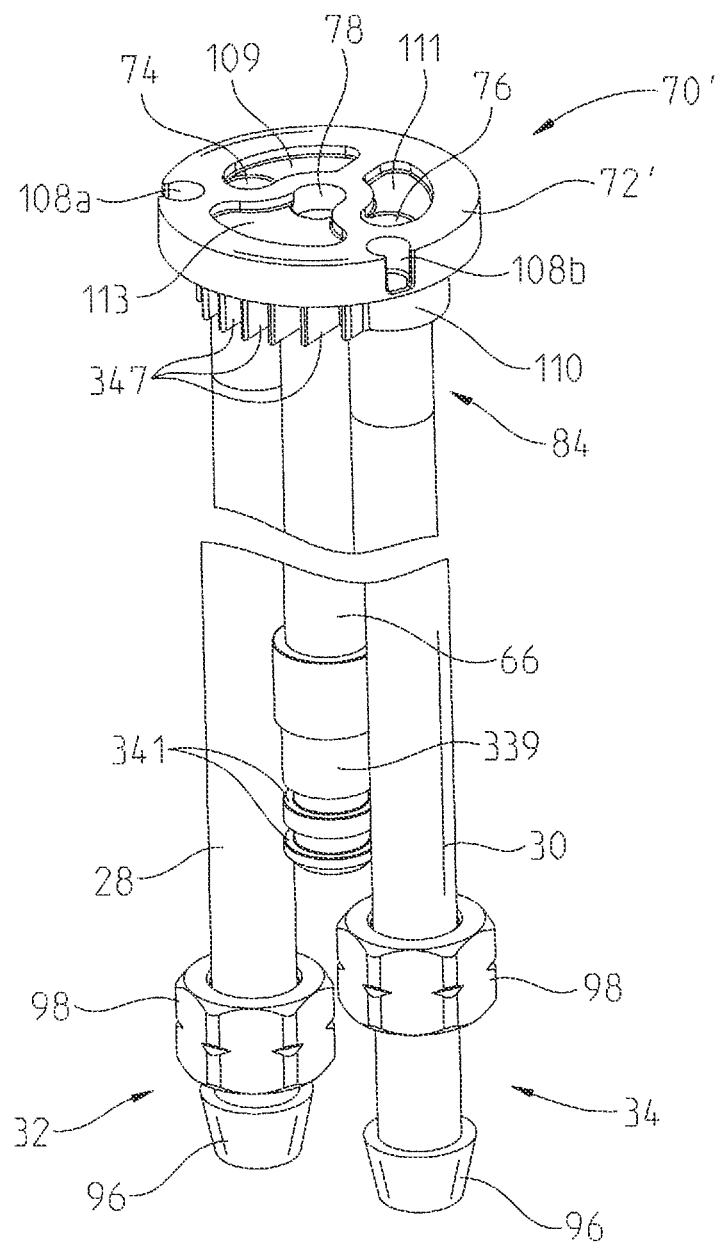
FIG. 19 is a partial perspective view of the molded waterway assembly of FIG. 18.

The valve assembly 100 is sealingly coupled to the base in a manner detailed above with respect to the faucet 10. A bonnet 348 is received over the valve assembly 100 and the molded waterway assembly 70'. The bonnet 348 threadably engages the external threads 60 of the holder 312. An annular lip 350 of the bonnet 348 engages the valve assembly 100, thereby securing the valve assembly 100 and the waterway assembly 70 to the holder 312 (FIG. 17).

Figure 24:
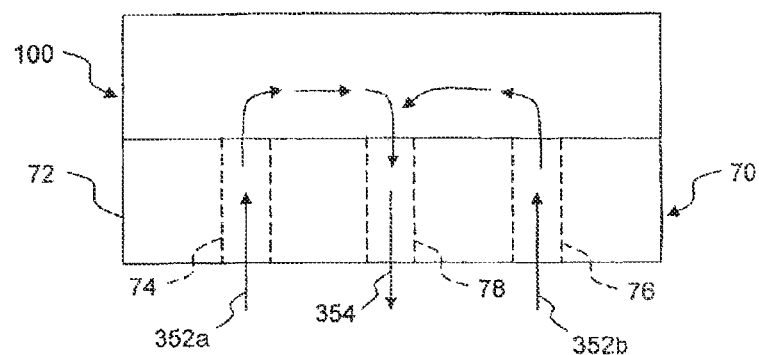
FIG. 24 is a diagrammatic view showing fluid flow in an illustrative waterway assembly.
Figure 25:
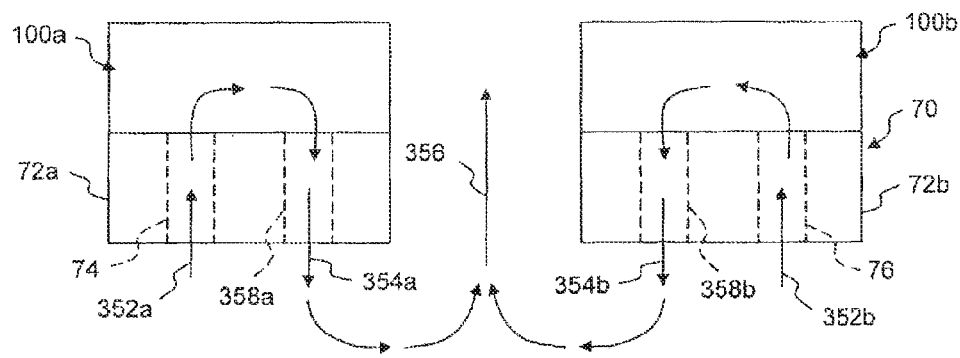
FIG. 25 is a diagrammatic view showing fluid flow in another illustrative waterway assembly.
Figure 26:
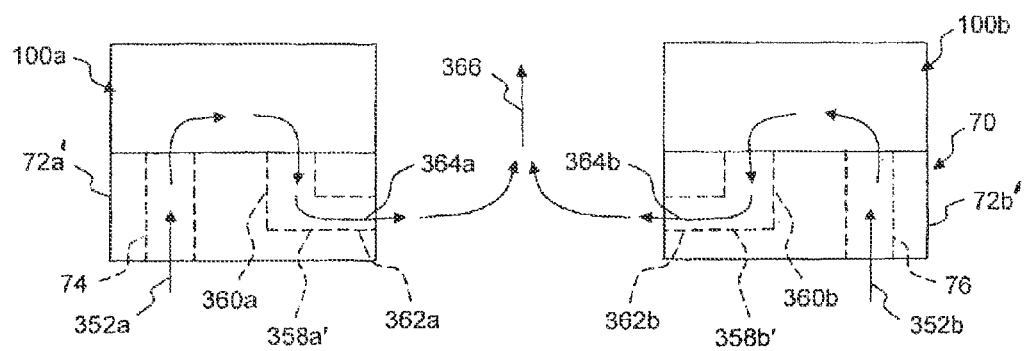
FIG. 26 is a diagrammatic view showing fluid flow in a further illustrative waterway assembly.

With reference now to FIGS. 24-26, various illustrative embodiments of waterway assembly 70 and cooperating flow directing member, illustratively valve assembly 100, are shown. In FIG. 24, the base 72 defines hot water inlet opening 74, cold water inlet opening 76, and outlet opening 78. Fluid passageways are defined by the inlet openings 74 and 76, cooperating valve assembly 100, and outlet opening 78. Hot and cold water travels in parallel directions (as shown by arrows 352a and 352b) through the inlet openings 74 and 76. Valve assembly 100 changes the water flow direction and redirects the mixed water flow in a second direction downwardly through the outlet opening 78 (as shown by arrow 354).

With further reference to FIG. 25, a further illustrative waterway assembly 70 is shown with two separate bases 72a and 72b. The separate bases 72a and 72b may be utilized for a widespread-type faucet. More particularly, hot water 352a enters through hot water inlet opening 74 formed within base 72a where it is redirected through a flow directing member, illustratively a hot water control valve 100. The redirected hot water passes in a second direction downwardly (as shown by arrow 354a) and out through hot water outlet 358a to a delivery spout (as shown by arrow 356). Similarly, cold water enters through cold water inlet opening 76 and is redirected by a cold water outlet valve 100b. The redirected cold water then exits the base 72b through cold water outlet 358b in a second direction to the delivery spout. As shown, the cold water combines with the hot water prior to exiting the delivery spout.

FIG. 26 illustrates yet another illustrative embodiment waterway assembly wherein first and second bases 72a' and 72b' are provided for a centerset-type faucet. The inlet openings 74 and 76 are similar to those identified above with respect to FIG. 25. Similarly, hot and cold water valves 100a and 100b are provided to control the flow of fluid through the respective inlets 74 and 76 to hot and cold water outlets 358a' and 358b', respectively. The hot and cold water outlets 358a' and 358b' in FIG. 26 each include first and second portions 360a, 360b and 362a, 362b, respectively, disposed at right angles to each other. More particularly, fluid flow in a first direction (as shown by respective arrows 352a, 352b) is redirected from the inlet 74, 76 to outlet 358a', 358b' for exiting base 72a', 72b' in a second direction (as shown by arrow 362a, 362b) which is substantially perpendicular to the first direction. The fluid flow from the outlets 358a' and 358b' then combines and passes to the outlet of a delivery spout (as shown by arrow 366).

Referring now to FIGS. 27-30, a further illustrative embodiment waterway assembly 470 is shown. The waterway assembly 470 includes many of the same features identified above with respect to waterway assembly 70. As such, similar components are identified with like reference numbers.

Figure 28:
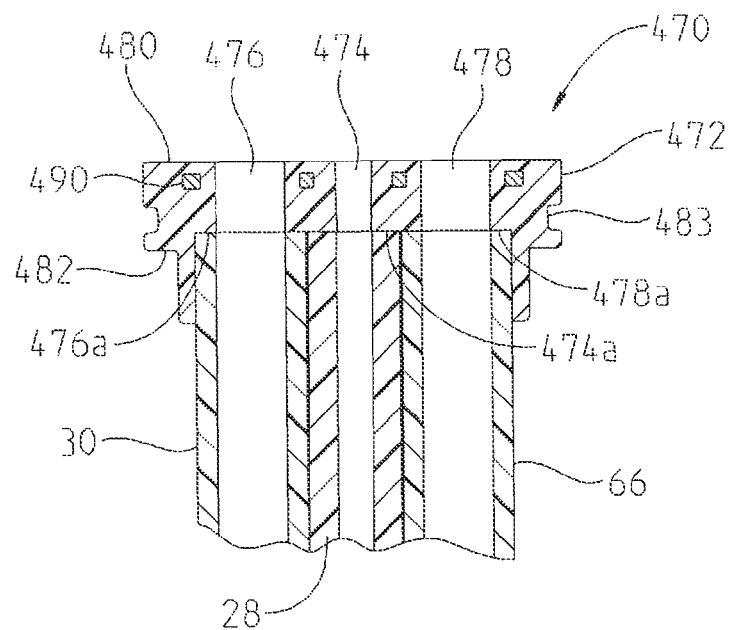
FIG. 28 is a cross-sectional view taken along line 28-28 of FIG. 27.

The molded waterway assembly 470 may be supported by a holder, such as holder 42, 312 detailed above. Similar to waterway assembly 70, waterway assembly 470 includes tubes 28, 30, and 66 overmolded with a valve interface member or base 472. More particularly, the molded waterway assembly 470 illustratively includes valve interface member or base 472 in the form of a puck or disk having a hot water inlet opening 474, a cold water inlet opening 476, and an outlet opening 478, all extending between upper and lower surfaces 480 and 482 (FIG. 28). An annular groove 483 may be formed within the base 472 to receive an o-ring (not shown). Hot water inlet tube 28, cold water inlet tube 30, and outlet tube 66 are fluidly coupled to the openings 474, 476, and 478, respectively, in the base 472. Hot water inlet tube 28, cold water inlet tube 30, outlet tube 66 and base 472 are illustratively formed of a polyethylene which is subsequently cross-linked to form cross-linked polyethylene (PEX). However, it should be appreciated that other polymers may be substituted therefor.

A valve assembly (not shown) is supported by the base 472 of the molded waterway assembly 470, in a manner similar to valve assembly 100 being supported by the base 72 of the molded waterway assembly 70 as detailed above. A lower surface of the valve assembly may sealingly engage a seal, such as a silicone gasket received intermediate the base 472 and the valve assembly. The gasket illustratively seals against a seat formed by the upper surface 480 of the base 472 and extends around the openings 474, 476, and 478.

The valve assembly interfacing with the base 472 may be of a Euro-motion design different from the valve assembly 100 detailed above. As such, the tubes 28, 30, and 66 are arranged within the base 472 in a different configuration due to the Euro-motion design of the valve assembly. More particularly, the openings 474, 476, and 478 receiving the tubes 28, 30, and 66 are not aligned along a vertical plane, and the outlet tube 66 is no longer positioned intermediate the hot water inlet tube 28 and the cold water inlet tube 30.

Locating elements, illustratively recesses 484a, 484b and 484c are formed within the upper surface 480 of the base 472, and are configured to receive cooperating locating elements, such as pegs, of the valve assembly. The position of the pegs within the recesses 484 facilitates proper orientation of the valve assembly relative to the molded waterway assembly 470 and hence, alignment with the tubes 28, 30, and 66 and respective openings 474, 476, and 478, with appropriate ports of the valve assembly. Engagement between the pegs and the recesses 484 may also improve resistance to torque generated between the valve assembly and the base 472.

Figure 27:
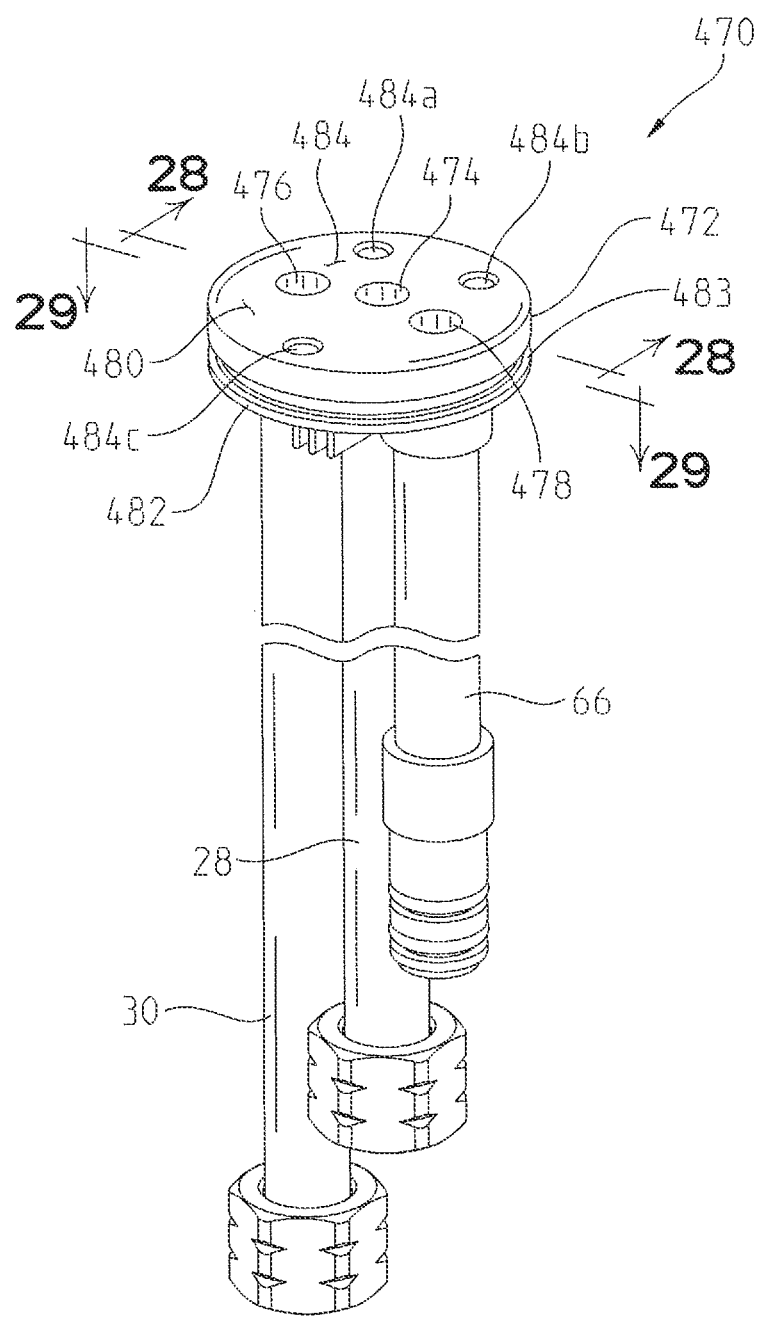
FIG. 27 is a partial perspective view of a further illustrative molded waterway assembly.
Figure 29:
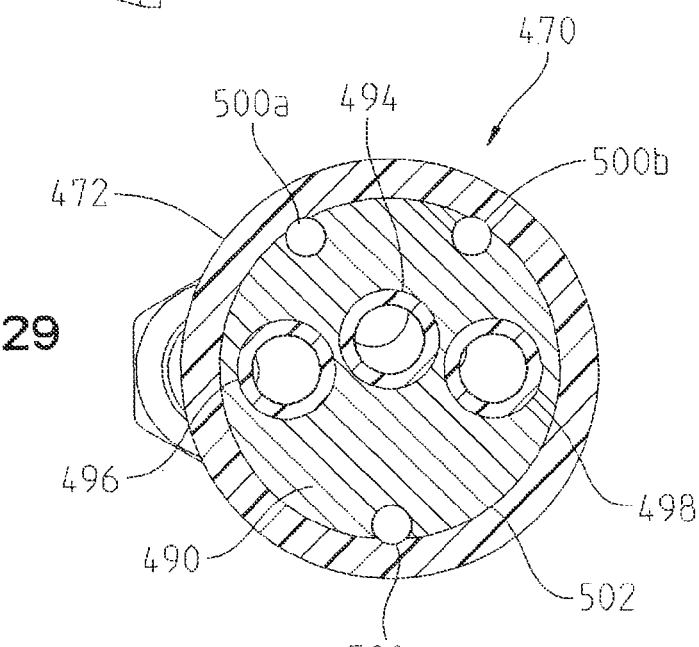
FIG. 29 is a cross-sectional view taken along line 29-29 of FIG. 27.
Figure 30:
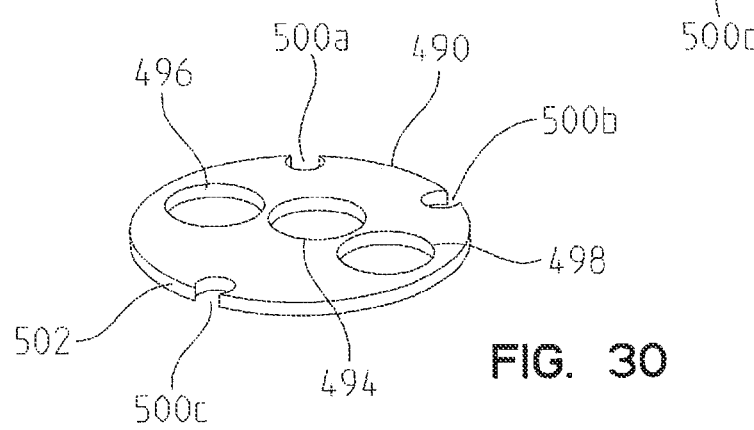
FIG. 30 is a perspective view of a support plate of the molded waterway assembly of FIG. 27.

With reference to FIGS. 27-29, the upper ends 84 of tubes 28, 30, and 66 are positioned within the openings 474, 476, and 478 of the base 472. Each opening 474, 476, and 478 includes a counterbore 474a, 476a, and 478a extending upwardly from the lower surface 482 and defining a stop surface which cooperates with the upper ends 84 of the tubes 28, 30, and 66, respectively. In the illustrative embodiment, the base 472 is overmolded around the upper ends 84 of the tubes 28, 30, and 66. More particularly, the base 472 is formed of a polymer which is molded over the previously formed tubes 28, 30, and 66, in the manner detailed herein. The overmold base 472 partially melts the upper ends 84 of the tubes 28, 30, and 66, forming couplings or bonds between material of the base 472 and material of the tubes 28, 30, and 66. In one illustrative embodiment, the tubes 28, 30, and 66, and the base 472 are all formed of polyethylene which is cross-linked following the overmolding operation.

The base 472 illustratively includes an internal support plate 490 to improve rigidity and reduce deflection of the base 472 during high pressure loads (e.g., high water pressure between valve assembly and base 472). The reduced deflection of the base 472 helps to minimize any potential gap formed between the valve assembly and the base 472 during burst testing. The minimized gap prevents the seal above the base 472 from migrating away from the pressure load and relieving to atmosphere. The support plate 490 also helps provide for a smooth or level upper surface 480 on the base 472.

The support plate 490 includes openings 494, 496, and 498 aligned with openings 474, 476, and 478 of the base 472. Arcuate notches 500a, 500b, and 500c are formed in the outer edge 502 of the support plate 490 to align with locating recesses 484a, 484b and 484c in the base 472 for receiving pegs of the valve assembly.

The base 472 is illustratively overmolded around the support plate 490. Illustratively, the base 472 encapsulates the support plate 490 so that no portion of the support plate 490 is exposed or visible from outside of the base 472. The support plate 490 is illustratively formed of a material having a stiffness greater than that of the overmolded base 472. For example, the PEX of the base 472 has a Modulus of Elasticity of approximately 0.8 GPa, and the stainless steel of the support plate 490 has a Modulus of Elasticity of approximately 180 GPa.

In the illustrative embodiment, the support plate 490 is formed of a metal. More particularly, the support plate 490 may be formed of stainless steel having a thickness of approximately 0.05 inches and an outer diameter of approximately 1.16 inches. It should be appreciated that materials other than metal, including polymers, may be used for the support plate 490 if having a stiffness greater than the material of the base 472.

Although the invention has been described in detail with reference to certain preferred embodiments, variations and modifications exist within the spirit and scope of the invention as described and defined in the following claims.

The invention claimed is:

1. A waterway assembly comprising:
a plurality of flexible tubular members formed of a polymer and having opposing first and second ends;
a support plate including a plurality of openings aligned with the first ends of the plurality of tubular members, the support plate having a plate stiffness; and
a base formed of a polymer having a base stiffness and overmolded around the first ends of the plurality of tubular members and the support plate, the plate stiffness being greater than the base stiffness.

2. The waterway assembly of claim 1, wherein the base is formed of a polymer.

3. The waterway assembly of claim 2, wherein the base is formed of a cross-linked polyethylene.

4. The waterway assembly of claim 2, wherein the support plate is formed of a metal.

5. The waterway assembly of claim 4, wherein the support plate is formed of a stainless steel.

6. The waterway assembly of claim 1, wherein the support plate is encapsulated by base.

7. The waterway assembly of claim 1, wherein the base includes an upper surface and a lower surface, the upper surface of the base being substantially planar and configured to cooperate with the lower surface of a valve assembly, and the plurality of tubular members extending downwardly from the lower surface.

8. The waterway assembly of claim 7, wherein the support plate includes a plurality of notches formed within an outer edge to receive locating elements of the valve assembly to facilitate proper orientation of the valve assembly relative to the base.

9. The waterway assembly of claim 7, further comprising a seal positioned intermediate the upper surface of the base and the lower surface of the valve assembly.

10. A waterway assembly comprising:
a support plate including a plurality of openings and having a plate stiffness;
a base including a plurality of openings aligned with the plurality of openings in the support plate, the base including a base stiffness; and
a plurality of tubular members formed of a cross-linked polymer and having opposing first and second ends, the first ends of the plurality of tubular members being received within the plurality of openings of the base;
wherein the plate stiffness is greater than the base stiffness.

11. The waterway assembly of claim 10, wherein the base is overmolded around the first ends of the tubular members and the support plate.

12. The waterway assembly of claim 11, wherein the plurality of tubular members and the base are formed of cross-linked polyethylene.

13. The waterway assembly of claim 10, wherein the base is formed of a polymer.

14. The waterway assembly of claim 13, wherein the base is formed of a cross-linked polyethylene.

15. The waterway assembly of claim 13, wherein the support plate is formed of a metal.

16. The waterway assembly of claim 15, wherein the support plate is formed of a stainless steel.

17. The waterway assembly of claim 10, wherein the support plate is encapsulated by base.

18. The waterway assembly of claim 10, wherein the base includes an upper surface and a lower surface, the upper surface of the base being substantially planar and configured to cooperate with the lower surface of a valve assembly, and the plurality of tubular members extending downwardly from the lower surface.

19. The waterway assembly of claim 18, wherein the support plate includes a plurality of notches formed within an outer edge to receive locating elements of the valve assembly to facilitate proper orientation of the valve assembly relative to the base.

20. The waterway assembly of claim 18, further comprising a seal positioned intermediate the upper surface of the base and the lower surface of the valve assembly.

* * * * *